United States Patent
Recio et al.

(10) Patent No.: US 9,982,528 B2
(45) Date of Patent: May 29, 2018

(54) TELEMETRY SYSTEM AND METHOD OF OPERATING THE SAME

(71) Applicant: Schlumberger Technology Corporation, Sugar Land, TX (US)

(72) Inventors: Adolfo Recio, Sugar Land, TX (US); Tamim Sawaf, Houston, TX (US); Ryan Parasram, Houston, TX (US); Hugues Bouvier, Sugar Land, TX (US); Robert Tennent, Katy, TX (US); Scott Cook, Austin, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 340 days.

(21) Appl. No.: 14/814,133

(22) Filed: Jul. 30, 2015

(65) Prior Publication Data
US 2016/0032714 A1    Feb. 4, 2016

(51) Int. Cl.
| | |
|---|---|
| *E21B 47/12* | (2012.01) |
| *H04Q 9/00* | (2006.01) |
| *E21B 44/00* | (2006.01) |
| *E21B 47/18* | (2012.01) |
| *E21B 49/00* | (2006.01) |
| *H04L 27/34* | (2006.01) |
| *G01K 1/02* | (2006.01) |
| *E21B 47/00* | (2012.01) |

(52) U.S. Cl.
CPC .............. *E21B 47/12* (2013.01); *H04Q 9/00* (2013.01); *E21B 44/00* (2013.01); *E21B 47/00* (2013.01); *E21B 47/182* (2013.01); *E21B 49/00* (2013.01); *G01K 1/026* (2013.01); *H04L 27/34* (2013.01)

(58) Field of Classification Search
CPC ....... E21B 47/12; E21B 47/187; G01K 1/024; G01K 1/026; H04L 27/34; H04Q 9/00
See application file for complete search history.

(56) References Cited

U.S. PATENT DOCUMENTS

| | | |
|---|---|---|
| 2002/0113718 A1 | 8/2002 | Wei et al. |
| 2002/0180613 A1 | 12/2002 | Shi et al. |

(Continued)

FOREIGN PATENT DOCUMENTS

| | | |
|---|---|---|
| EP | 1970873 A2 | 9/2008 |
| GB | 2352150 A | 1/2001 |

(Continued)

OTHER PUBLICATIONS

Extended European Search Report issued in EP Application No. 15179284.3 dated Dec. 21, 2015; 9 pages.

*Primary Examiner* — Benyam Haile
(74) *Attorney, Agent, or Firm* — Sara K. M. Hinkley

(57) ABSTRACT

Methods and related apparatus pertaining to downhole and surface telemetry, such as a method in which a telemetry system is provided with a communication path formed with an electrically conductive transport medium coupled across a plurality of downhole nodes. Such method includes operating on the communication path with a multi-drop system that provides telemetry to the downhole nodes in a wellbore, including employing modulation in a master-slave arrangement using binary differential phase shift keying or differential quadrature phase shift keying.

14 Claims, 16 Drawing Sheets

(56) References Cited

U.S. PATENT DOCUMENTS

| | | | | |
|---|---|---|---|---|
| 2004/0020643 A1* | 2/2004 | Thomeer | ............... | E21B 47/01 |
| | | | | 166/250.01 |
| 2004/0217880 A1* | 11/2004 | Clark | ................... | E21B 17/028 |
| | | | | 340/854.9 |
| 2009/0225630 A1* | 9/2009 | Zheng | ..................... | G01V 1/42 |
| | | | | 367/81 |
| 2010/0194586 A1 | 8/2010 | Tjhang et al. | | |
| 2010/0245121 A1* | 9/2010 | Reed | ...................... | E21B 47/18 |
| | | | | 340/855.4 |
| 2013/0146279 A1* | 6/2013 | Chang | .................... | E21B 47/12 |
| | | | | 166/244.1 |
| 2015/0226057 A1* | 8/2015 | Bonavides | ............ | E21B 43/116 |
| | | | | 340/854.4 |

FOREIGN PATENT DOCUMENTS

| | | | |
|---|---|---|---|
| GB | 2401187 | A | 11/2004 |
| WO | 2007081651 | A2 | 7/2007 |
| WO | 2013101581 | A1 | 7/2013 |

\* cited by examiner

| 1810 | 1820 | 1830 | 1840 | 1850 |
|---|---|---|---|---|
| Poll Set Configuration (8 Bits) | Node ID (24 Bits) | Length (8 Bits) | Poll Set Descriptor (Variable) | CRC-8 (8 Bits) |

FIG. 18

1910 { Node Alias (8 Bits)

1920 { | PS(n) n In 0 To 7 | Tx Time (16 Bits) | Number Of Values In PS(n) 8 Bits | Value ID x (8 Bits) | Number Of Bytes Of Value ID x (8 Bits) | ... | Value ID y (8 Bits) | Number Of Bytes Of Value ID y (8 Bits) | PS(n) Checksum (8 Bits) |

1930 { | PS(m) m In 0 To 7 | Tx Time (16 Bits) | Number Of Values In PS(m) 8 Bits | Value ID w (8 Bits) | Number Of Bytes Of Value ID w (8 Bits) | ... | Value ID z (8 Bits) | Number Of Bytes Of Value ID z (8 Bits) | PS(m) Checksum (8 Bits) |

FIG. 19

| 2010 | 2020 |
|---|---|
| Timing Source (1 Bit) | Time To Transmit |

FIG. 20

TELEMETRY SYSTEM AND METHOD OF OPERATING THE SAME

CROSS-REFERENCE TO RELATED APPLICATIONS

This application claims benefit to U.S. Provisional Application Ser. No. 62/031,601, entitled "Telemetry System and Method of Operating the Same," that was filed Jul. 31, 2014. The entirety of the foregoing is incorporated herein by reference.

BACKGROUND OF THE DISCLOSURE

Accurate and rapid collection and distribution of geophysical property data provides information for the exploration and production of petroleum resources. Based on data such as electrical and nuclear properties collected in a wellbore, as well as the propagation of sound through a formation, geophysicists make an analysis for operational decisions. The analysis includes determination of whether a well is likely to produce hydrocarbons, whether to drill additional wells in the vicinity of an existing well, and whether to abandon a well as being unproductive. Measurements of the type described herein are also useful in the fields of carbon dioxide (CO2) sequestration, development of methane hydrate deposits, water reservoir and geothermal monitoring, earthquake monitoring, and monitoring for reservoir delineation, among other applications that are known to persons skilled in the art.

Geophysicists may also use wellbore data to select where to set a casing in a well and to decide on how to perforate a well to stimulate hydrocarbon flow. One method of collecting wellbore geophysical properties is by way of well logging. In well logging, a logging tool (also often referred to as a sonde) is lowered into a wellbore on an electrical cable, the wireline. The logging tool is an electrically powered measurement device that may, for example, collect electrical data, sonic waveforms that are propagated through the surrounding formation, or radioactivity counts. These measurements are usually converted to a digital form and transmitted on the wireline. Systems for transmitting data from the wellbore logging tool to a surface acquisition system over a wireline cable are known as wireline telemetry systems.

Typical wireline telemetry systems operate under extreme conditions, such as high temperature, low signal-to-noise ratio (SNR) at the surface and/or downhole receivers due to high distortion caused by a long cable length, among other extreme conditions that are known to exist in wellbores of the type described herein. In wireline telemetry systems, a downhole telemetry module collects data that are sent from one or more measurement tools connected thereto and transmits the downhole data to a surface acquisition system through a cable. Depending on the tool string combination and the wellbore conditions, several types of noise can be generated, which tend to negatively affect the conveyance of data and the performance of the telemetry system.

Logging and monitoring wellbores has been done for many years to enhance and observe recovery of oil and gas deposits. In the logging of wellbores as mentioned above, one method of making measurements underground includes attaching one or more tools to a wireline connected to the surface acquisition system. The tools are then lowered into a wellbore by the wireline and drawn back to the surface ("logged") through the wellbore while taking measurements. The wireline is usually an electrical cable with limited data transmission capability. Similarly, permanent monitoring systems are established with permanent sensors that are also generally attached to the electrical cable.

Demand for higher data rates for wireline logging tools and permanent monitoring systems is growing rapidly because of higher resolution sensors, faster logging speeds, and additional tools available for a single wireline string. As a consequence of a need for higher data rates, problems in data transmission arise such as degradation of data quality. Therefore, it would be desirable to transfer data between downhole tools and the surface acquisition system with improved signal-to-noise ratio (SNR) so that the quality of the transferred data is not compromised.

SUMMARY OF THE DISCLOSURE

The present disclosure introduces telemetry systems operable, without limitation, with a surface acquisition system in communication with downhole nodes in a wellbore through a subterranean formation.

These and additional aspects of the present disclosure are set forth in the description that follows, and/or may be learned by a person having ordinary skill in the art by reading the materials herein and/or practicing the principles described herein. At least some aspects of the present disclosure may be achieved via means recited in the attached claims.

BRIEF DESCRIPTION OF THE DRAWINGS

The present disclosure is best understood from the following detailed description when read with the accompanying FIGUREs. It is emphasized that, in accordance with the standard practice in the industry, various features are not drawn to scale. In fact, the dimensions of the various features may be arbitrarily increased or reduced for clarity of discussion.

FIG. 18 is a block diagram of a poll set configuration frame according to one or more aspects of the present disclosure.

FIG. 19 is a block diagram of a data structure for a poll set descriptor of a poll set configuration frame according to one or more aspects of the present disclosure.

FIG. 20 is a block diagram of a data structure for a transmit time field of a poll set descriptor of a poll set configuration frame according to one or more aspects of the present disclosure.

DETAILED DESCRIPTION

Figure 1A:
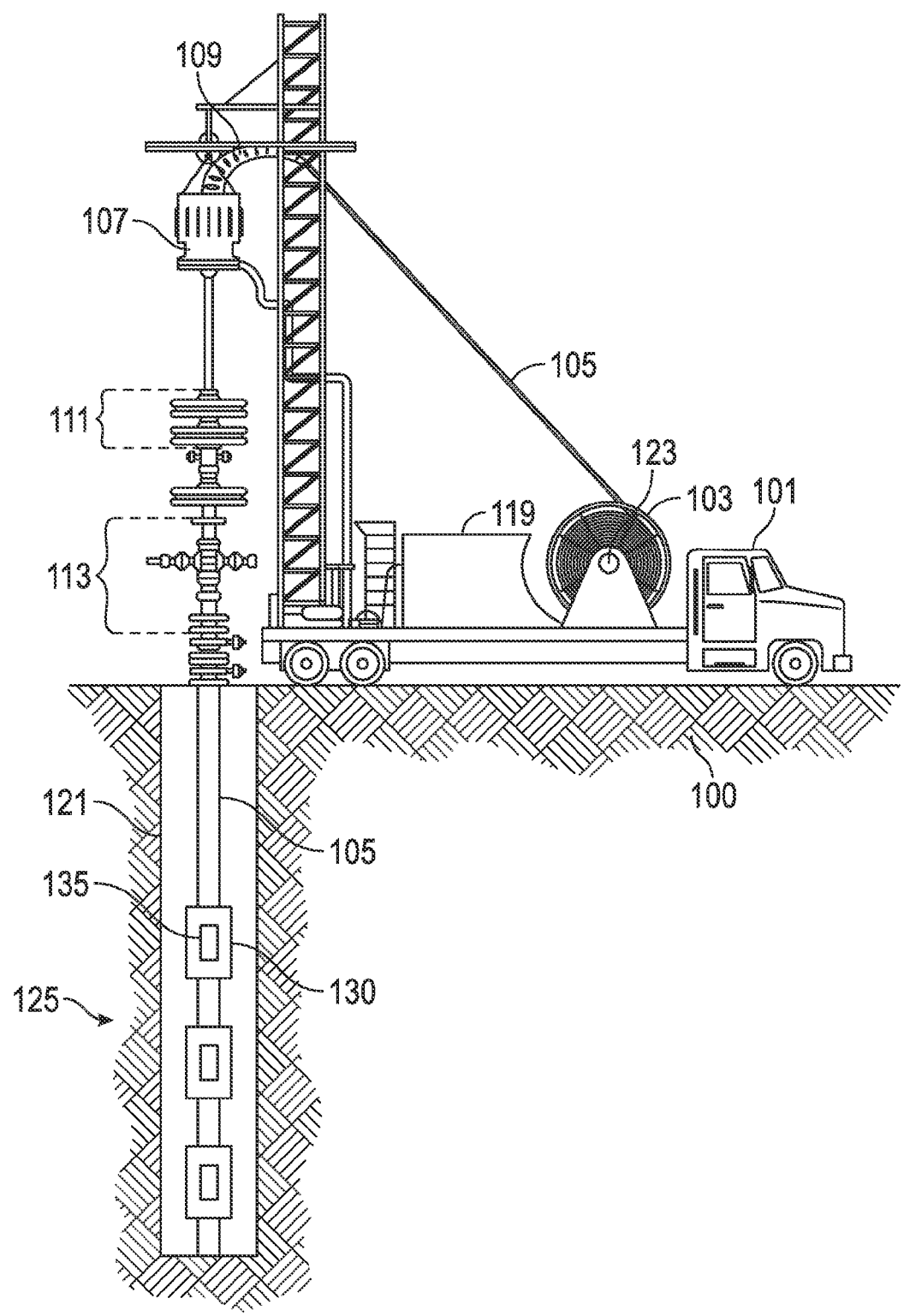
FIGS. 1A and 1B are a schematic view of at least a portion of apparatus according to one or more aspects of the present disclosure.

It should be noted that, in the development of an actual implementation within the scope of the present disclosure, numerous implementation-specific decisions may be made to achieve predetermined goals, such as compliance with system- and business-related constraints, which may vary from one implementation to another. However, a person having ordinary skill in the art will appreciate that such development may be complex and time consuming, but would nevertheless be a routine undertaking for those of ordinary skill in the art having the benefit of the present disclosure.

Example implementations within the scope of the present disclosure are described below with reference to the accompanying drawings. Numerous details are set forth below to provide a more thorough understanding of various aspects of the present disclosure. However, a person having ordinary skill in the art will appreciate that the example implementations disclosed herein may be practiced without some of these details. In other instances, well-known features may not be described in detail, such as may avoid complicating the following description.

Various terminology and phraseology are used herein for descriptive purposes, and thus may not be limiting in scope. Language such as "including," "comprising," "having," "containing," and "involving," and variations thereof, is intended to be broad and encompass the subject matter listed thereafter, equivalents, and additional subject matter not explicitly recited.

In addition, the present disclosure may repeat reference numerals and/or letters in the various example implementations. This repetition is for simplicity and clarity, and does not in itself dictate a relationship between the various implementations, embodiments, and/or configurations described below.

Implementations within the scope of the present disclosure may relate generally, but not by way of limitation, to an apparatus and method for wellbore telemetry in surveys relating to subterranean formations. More specifically, some aspects disclosed herein are directed to methods and systems for transmitting data between a downhole tool and surface equipment such as a surface acquisition system employing a telemetry system for selectively sending information to improve the reliability of data transfer, in particular, in difficult environments such as wellbore logging. While the surface acquisition system is illustrated in the environment of a wireline tool, the telemetry system may be employed is any application to communication information between nodes of a working system or the like.

Figure 1B:
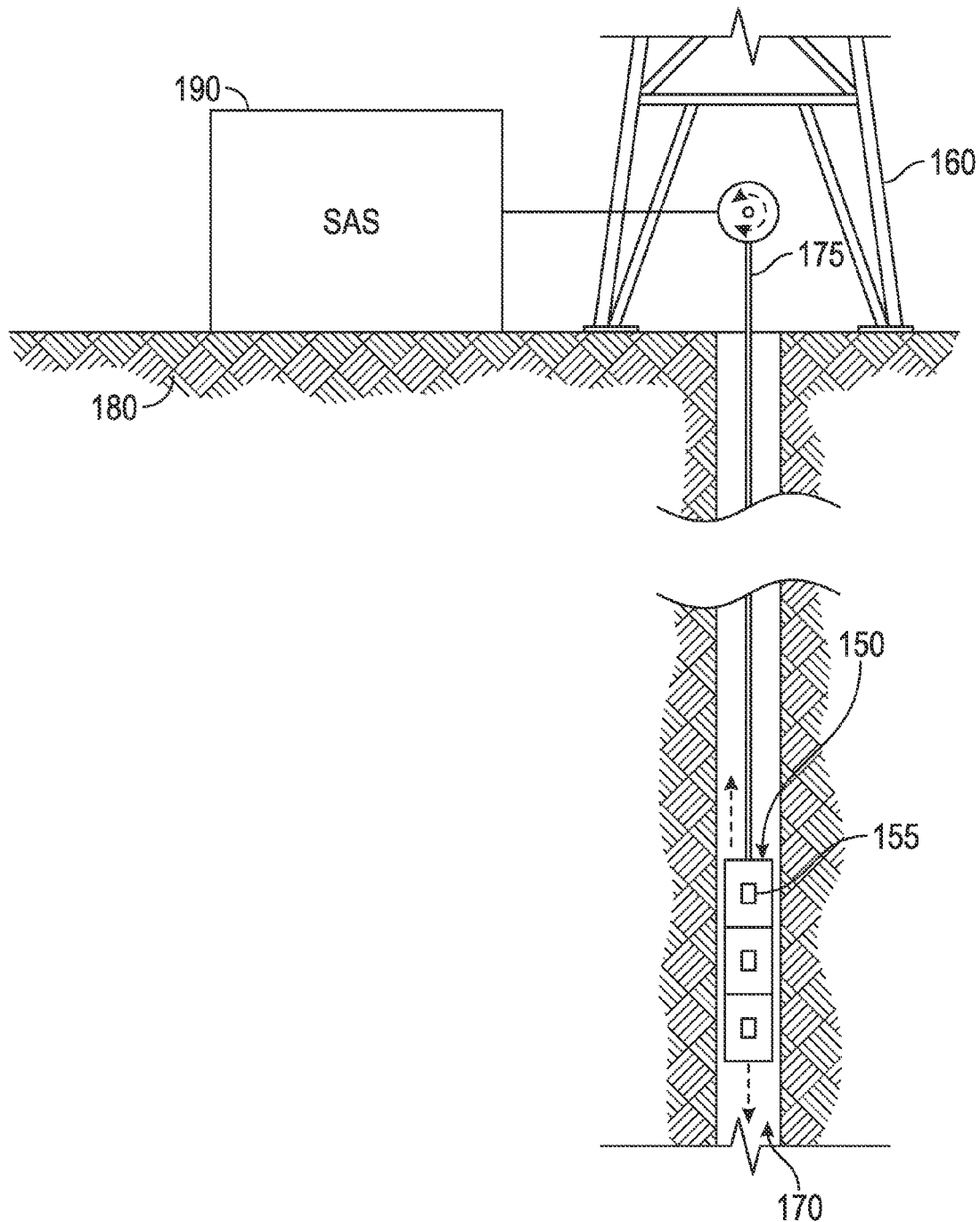

FIGS. 1A and 1B are a schematic view of at least a portion of apparatus according to one or more aspects of the present disclosure. The apparatus comprises a plurality of downhole tools (e.g., wireline tools of which one is designated 150) that may be suspended from a platform, rig, derrick, and/or other wellsite structure 160 in a wellbore 170 formed in a subterranean formations 180. The downhole tools 150 may comprise one or more sensors, release devices, perforating guns, or the like. For example, the sensors may be operable to measure or detect one or more of pressure, temperature, composition, resistivity, dielectric constant, magnetic resonance relaxation time, nuclear radiation, and/or combinations thereof, although other types of sensors are also within the scope of the present disclosure. The downhole tools 150 each include a telemetry module (one of which is designated 155), which collectively form a telemetry system node (also referred to as a downhole node). The telemetry module 155 may form a portion of a telemetry system as set forth below.

The downhole tools 150 may be deployed from the wellsite structure 160 into the wellbore 170 via a wireline cable 175, although other means for conveying the downhole tools 150 within the wellbore 170 are also within the scope of the present disclosure. As the downhole tools 150 operate, various information from the downhole tools 150 may be sent via the respective telemetry module 155 over one or more communications paths (not shown) to a surface acquisition system (SAS) 190 at a wellsite surface. The surface acquisition system 190 includes a computer with a processor, memory, and/or other peripheral devices. The surface acquisition system 190 may include at least a portion of a telemetry system and may be operable to control of an operation of the downhole tools 150, collect measurement data, calibrate measurement data, and/or provide transmission between the downhole tools 150 and the wellsite surface. The surface acquisition system 190 may also be utilized to transmit the received signals to offsite locations.

Figure 2:
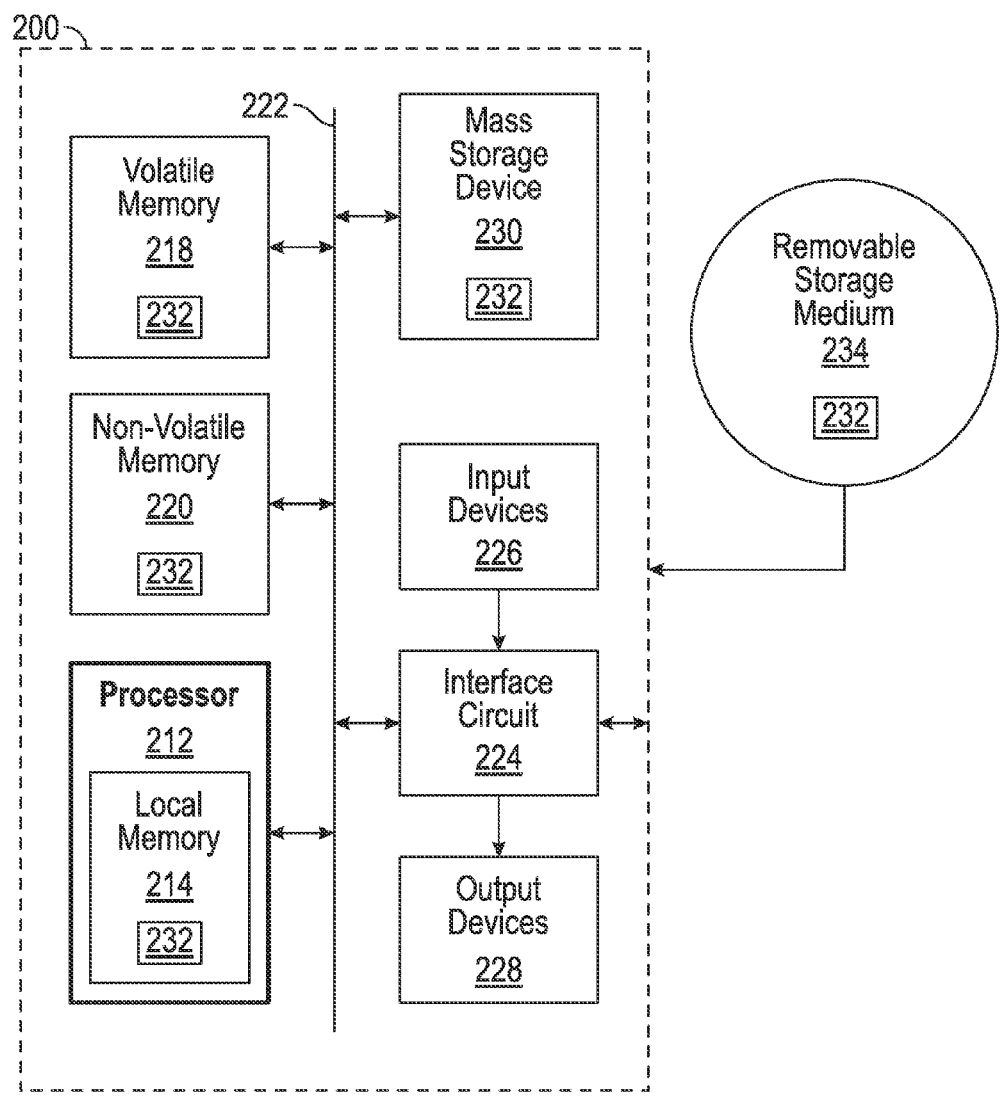
FIG. 2 is a block diagram of at least a portion of apparatus according to one or more aspects of the present disclosure.

FIG. 2 is a block diagram of at least a portion of apparatus according to one or more aspects of the present disclosure. The apparatus comprises a processing system 200 that may execute example machine-readable instructions to implement at least a portion of one or more of the methods and/or processes described herein, and/or to implement a portion of one or more of the example downhole tools described herein. The processing system 200 may be or comprise, for example, one or more processors, controllers, special-purpose computing devices, servers, personal computers, personal digital assistant (PDA) devices, smartphones, internet appliances, and/or other types of computing devices. Moreover, while it is possible that the entirety of the processing system 200 shown in FIG. 2 is implemented within a downhole tool 150 and/or telemetry module 155 shown in FIGS. 1A and 1B, it is also contemplated that one or more components or functions of the processing system 200 may be implemented in wellsite surface equipment, perhaps including the surface acquisition system 190 and/or other wellsite surface equipment depicted in FIGS. 1A and 1B.

The processing system 200 comprises a processor 212 such as, for example, a general-purpose programmable processor. The processor 212 comprises a local memory 214, and executes coded instructions 232 present in the local memory 214 and/or in another memory device. The processor 212 may execute, among other things, machine-readable instructions or programs to implement the methods and/or processes described herein. The programs stored in the local memory 214 may include program instructions or computer program code that, when executed by an associated processor, enable surface acquisition system and/or telemetry module to perform tasks as described herein. The processor 212 may be, comprise, or be implemented by one or a plurality of processors of various types suitable to the local application environment, and may include one or more of general-purpose computers, special purpose computers, microprocessors, digital signal processors (DSPs), field-programmable gate arrays (FPGAs), application-specific integrated circuits (ASICs), and processors based on a multi-core processor architecture, as non-limiting examples. Of course, other processors from other families are also appropriate.

The processor 212 is in communication with a main memory including a volatile memory 218 and a non-volatile memory 220 via a bus 222. The volatile memory 218 may be, comprise, or be implemented by random access memory (RAM), static random access memory (SRAM), synchronous dynamic random access memory (SDRAM), dynamic random access memory (DRAM), RAMBUS dynamic random access memory (RDRAM) and/or other types of random access memory devices. The non-volatile memory 220 may be, comprise, or be implemented by read only memory, flash memory and/or other types of memory devices. One or more memory controllers (not shown) may control access to the volatile memory 218 and/or the non-volatile memory 220.

The processing system 200 also comprises an interface circuit 224. The interface circuit 224 may be, comprise, or be implemented by various types of standard interfaces, such as an Ethernet interface, a universal serial bus (USB), a third generation input/output (3GIO) interface, a wireless interface, and/or a cellular interface, among others. The interface circuit 224 may also comprise a graphics driver card. The interface circuit 224 may also comprise a communication device such as a modem or network interface card to facilitate exchange of data with external computers via a network (e.g., Ethernet connection, digital subscriber line ("DSL"), telephone line, coaxial cable, cellular telephone system, satellite, etc.).

One or more input devices 226 are connected to the interface circuit 224. The input device(s) 226 permit a user to enter data and commands into the processor 212. The input device(s) 226 may be, comprise, or be implemented by, for example, a keyboard, a mouse, a touchscreen, a track-pad, a trackball, an isopoint, a voice recognition system and/or sensors, among others.

One or more output devices 228 are also connected to the interface circuit 224. The output devices 228 may be, comprise, or be implemented by, for example, display devices (e.g., a liquid crystal display or cathode ray tube display (CRT), among others), printers, speakers and/or an output to a telemetry system, among others.

The processing system 200 may also comprise one or more mass storage devices 230 for storing machine-readable instructions and data. Examples of such mass storage devices 230 comprise floppy disk drives, hard drive disks, compact disk (CD) drives, and digital versatile disk (DVD) drives, among others. The coded instructions 232 may be stored in the mass storage device 230, the volatile memory 218, the non-volatile memory 220, the local memory 214, and/or on a removable storage medium 234, such as a CD or DVD. Thus, the modules of the processing system 200 may be implemented in accordance with hardware (embodied in one or more chips including an integrated circuit such as an application specific integrated circuit), or may be implemented as software or firmware for execution by a processor. In particular, in the case of firmware or software, the embodiment can be provided as a computer program product including a computer readable medium or storage structure embodying computer program code (i.e., software or firmware) thereon for execution by the processor.

The present disclosure introduces telemetry system employing a cable with copper conductors and may be referred to as a Lite Telemetry System (LTS). The telemetry system can standardize existing wellbore wireline low bandwidth telemetry systems that can be employed with downhole control and data-acquisition arrangements.

Figure 3:
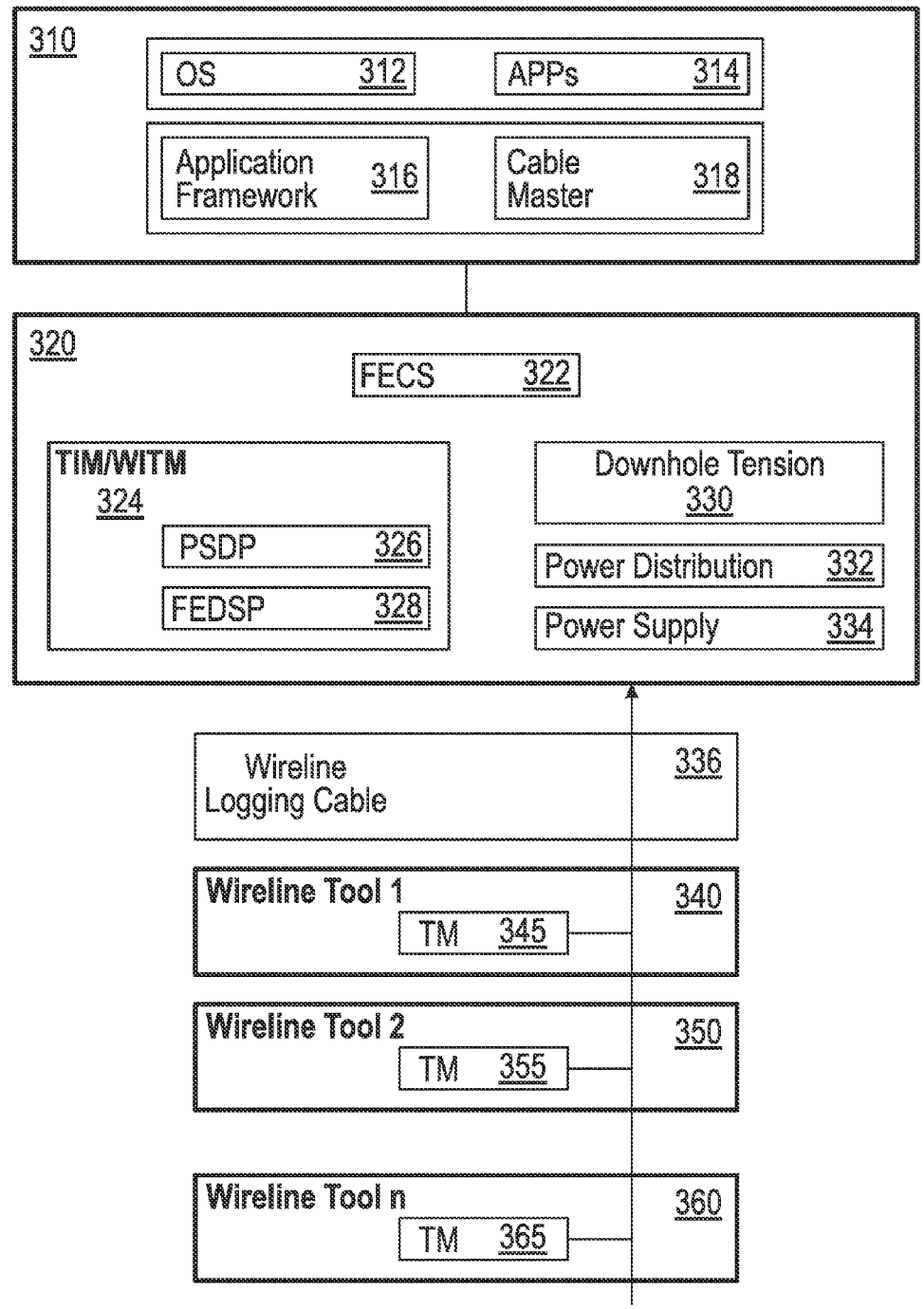
FIG. 3 is a block diagram of at least a portion of apparatus according to one or more aspects of the present disclosure.

FIG. 3 is a block diagram of at least a portion of apparatus according to one or more aspects of the present disclosure. In particular, FIG. 3 illustrates at least a portion of a telemetry system employable with a downhole tool. The telemetry system comprises a surface acquisition system including surface acquisition system software 310 and a surface acquisition system front-end 320. The surface acquisition system software 310 comprises an operating system ("OS") 312 that hosts a surface application framework (Application Framework) 316 such as MaxWell developed by Schlumberger and tool specific applications ("APPs") 314 (also developed by Schlumberger) for operation with the surface acquisition system front-end 320. The Application Framework 316 includes one of more cable masters 318 that provide an application interface for communicating with cable telemetry to acquire data transmitted to and from the downhole tools.

The surface acquisition system front-end 320 comprises at least one front-end control system (FECS) 322 (e.g., a wireline acquisition front end (WAFE) system and/or an enhanced version of the wireline acquisition front-end (eWAFE) system) and at least one telemetry interface module (TIM)/wireline interface telemetry module (WITM) 324. The TIM/WTIM 324 comprises a protocol digital signal processor (PDSP) 326 and a front-end digital signal processor (FEDSP) 328. A demodulator/modulator are implemented in the FEDSP 328, which interfaces an example seven-conductor cable employing a T5 or a T7 telemetry mode via an analog front-end (e.g., including amplifiers and filters). The surface acquisition system front-end 320 also includes a downhole tension measurement system 330 that senses and controls the tension of a downhole cable or wireline, and a power distribution module 332 that couples power produced by a power supply 334 to the downhole cable and, ultimately, to the downhole tools (e.g., wireline tools). The applications 314 of the surface acquisition system software 310 support various software applications such as codes for telemetry communication, interfaces with measurement systems, software that interfaces with a downhole tension measurement system 330 for the wireline truck/offshore platform, and various applications for interfacing with the downhole tools and other equipment on the truck or offshore platform.

A wireline logging cable 336 represents the downhole cable or wireline coupled to cable telemetry. A plurality of wireline tools 340, 350, 360 with corresponding downhole telemetry modules (TM) 345, 355, 365 are coupled to the wireline logging cable 336, and each represent a telemetry system node (also referred to as a downhole node).

In the illustrated communication architecture, the telemetry system can use a T7 or other multi- or single-conductor cable transmission mode across an entire wireline. A T5 or a T7 telemetry mode employs, respectively, a seven-conductor (hepta) cable, or a single-conductor cable (e.g., a coaxial cable), generally formed as a copper-conductor cable, as the telemetry transport medium. T5 and T7 telemetry modes employed for communication with downhole nodes can operate concurrently and provide independent data channels. The T5 and T7 telemetry modes can share the same carrier frequencies, but can operate independently. The T5 and T7 telemetry modes provide orthogonal signals with multi-input/multi-output (MIMO) signaling capability. The T5 telemetry mode is a differential mode that is generally less susceptible to interference, particularly to common-mode noise sources such as may be produced by motors and other electromechanical downhole equipment. The T7 telemetry mode is a common-mode process that is more susceptible to downhole noise sources. Accordingly, the T5 telemetry mode is generally more robust than the T7 telemetry mode.

Figure 4:
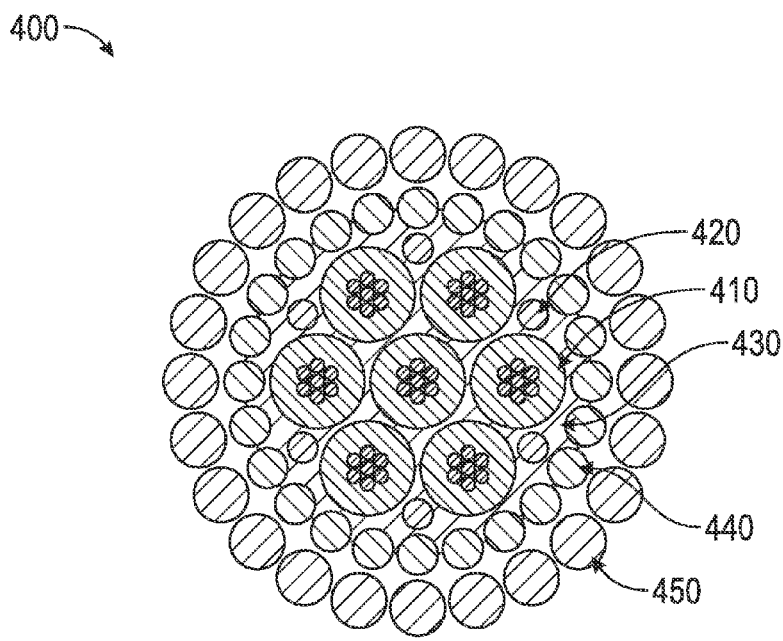
FIG. 4 is a cross-sectional view of at least a portion of apparatus according to one or more aspects of the present disclosure.

FIG. 4 is a cross-sectional view of at least a portion of apparatus according to one or more aspects of the present disclosure. In particular, FIG. 4 illustrates an electrically conductive cable (an electrically conductive transport medium) 400 employed for telemetry between a surface acquisition system and downhole nodes. The electrically conductive cable 400 allows for wireline tool deployment including delivering power to the wireline tools, conducting signals between the wireline tools and surface equipment (e.g., a surface acquisition system) and measuring well depth. The illustrated electrically conductive cable 400 is formed with seven conductors (designated conductors #1-#7), each preferably copper, each surrounded by an insulator material (one of which is designated 410 about conductor #6). Compression-resistant fillers (one of which is designated 420) are positioned around the seven conductors #1-#7 that are encased in a protective jacket 430. The protective jacket 430 in turn is surrounded by an inner armor 440. The inner armor 440 is then surrounded by an outer armor 450 to provide strength and protection in conjunction with the inner armor 440 for the seven conductors #1-#7. The insulator material 410 and the protective jacket 430 provide a compression and chemically resistant sheath.

Figure 5:
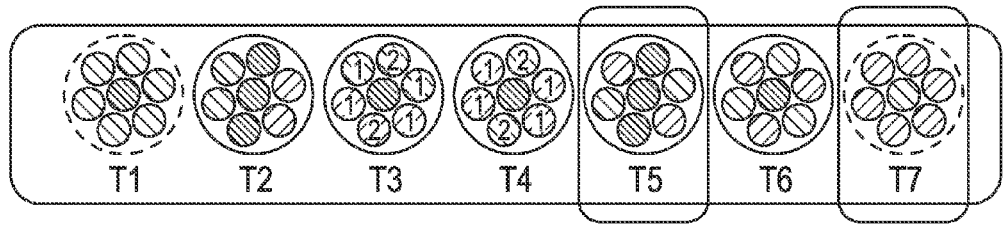
FIGS. 5-7 are views of selected telemetry modes according to one or more aspects of the present disclosure.
Figure 6:
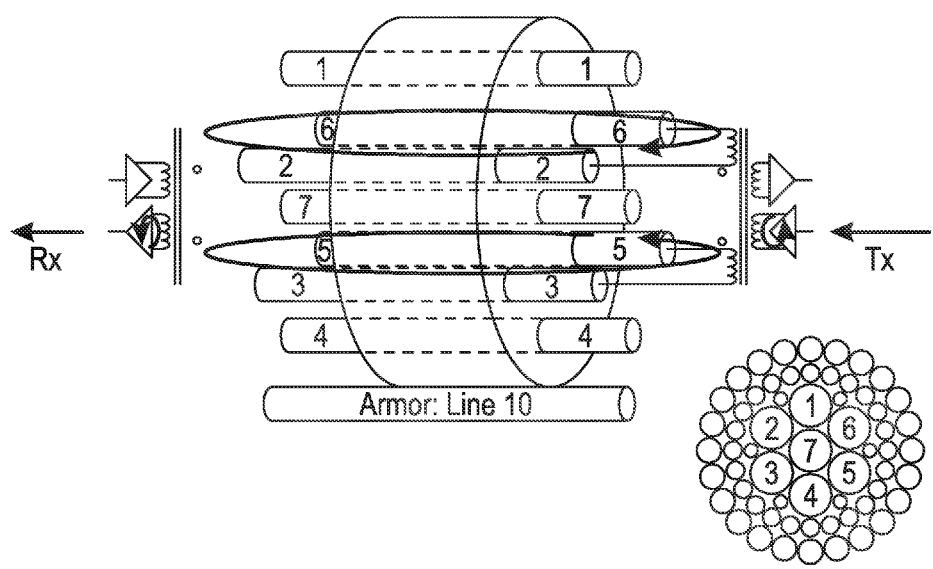
Figure 7:
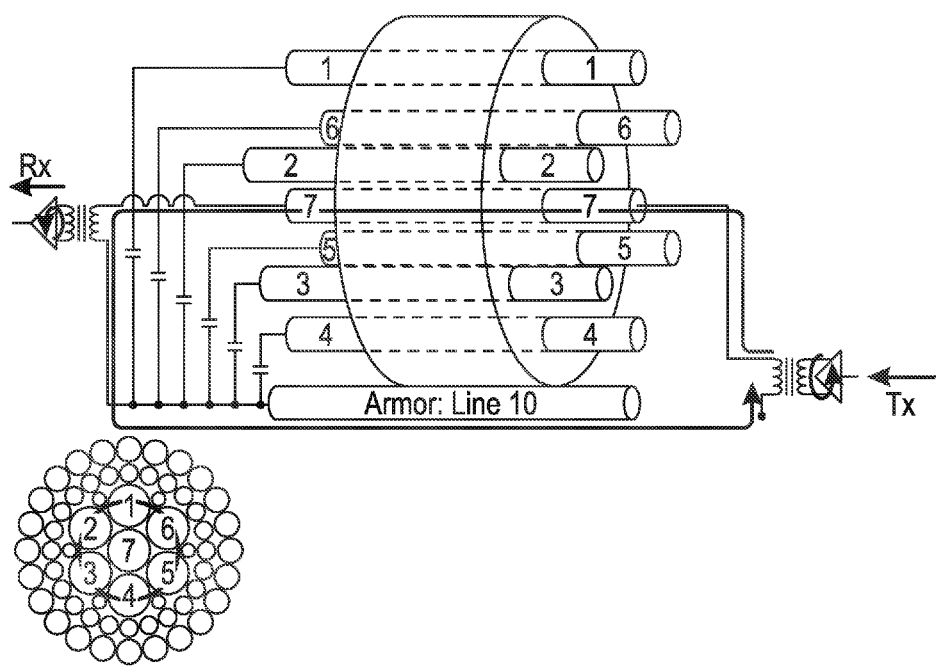

FIGS. 5-7 are views of selected telemetry modes according to one or more aspects of the present disclosure. As illustrated in FIG. 5, the telemetry modes are deployed by using ones of seven conductors of an electrically conductive cable (e.g., a seven-conductor hepta cable). For instance in a T5 telemetry mode, telemetry signals traverse conductors #2 and #5 with return telemetry signals traversing conductors #3 and #6. As illustrated in FIG. 6, a transmitter Tx induces telemetry signals on the two closed loops (formed with conductors #2 and #6, and conductors #3 and #5) to create a communication path for the telemetry signals that is received by a receiver Rx. Conductors #1, #4, and #7 are not used in T5 telemetry mode. Surrounding conductors (designated armor: line 10 shown in FIG. 6) provide mechanical protection for the inner conductors. In a T7 telemetry mode, telemetry signals traverse on the conductor #7 and return telemetry signals traverse conductor #1-#6 including the surrounding conductors. Thus, in the T7 telemetry mode, conductors #1-#6 are coupled to the surrounding armor, producing a pseudo-coaxial line. As illustrated in FIG. 7, the conductor #7 and the surrounding conductors (armor: line 10) create a closed communication path for a telemetry signal. Of course, other types of cables such as monocable or coaxial cable can be used as well.

Each downhole tool that employs telemetry capability will have a telemetry module coupled to the cable/wireline/transport medium. A downhole node includes a telemetry module with a processor (e.g., a microcontroller) that is able to process commands sent from the surface acquisition system to perform action(s) and/or send measurement data up to surface acquisition system depending on the telemetry application type. Each downhole node may have a unique identifier that the surface acquisition system uses to address the node.

This architecture closely resembles an electrical telemetry system (ETS) and an addressable switch firing system (ASFS) architecture as there is no need for a central telemetry downhole module acting as a telemetry master as in other architectures such as mono-cable telemetry system (MTS) or enhanced digital telemetry system (EDTS). Instead, the surface acquisition system operates as the telemetry master to poll each downhole node for information or data and to transmit commands to a downhole tool requesting that a specific action be taken by other downhole nodes, such as executing a wellbore perforation command or opening a switch in a communication path. The telemetry platform introduced herein differs from ASFS telemetry by supporting multi-drop functions, i.e., multiple downhole nodes that have the capability to access the transmission medium (or communication path) at substantially the same time without the use of switches that electrically decouple a downhole node from the transmission medium. The telemetry architecture introduced herein can be arranged to support peer-to-peer communication between downhole nodes.

With the telemetry system introduced herein, the telemetry platform can provide communication from the surface acquisition system to downhole nodes with a manageable hardware footprint. A telemetry module is integrated into each downhole tool with telemetry functionality. The telemetry system is addressable with each downhole node being polled on demand using a unique identifier.

Several application types can be implemented in the telemetry system. One application type is a control-type application wherein a user-initiated command is sent to perform a specific downhole action. This action could be releasing a logging head from a wireline cable, operating a solenoid, or switching a relay to route power lines downhole. In general, these types of applications employ a low data rate and are usually actively operated over a short period of time.

A second application type employed with an LTS Switch Firing System (LSFS) is a wellbore perforation addressable switch. For this application type, a user at the surface would implement several perforating guns in the tool string with a location correlation device (e.g., a casing collar locator or a gamma ray device). The operator may detonate a gun individually, generally starting from the lowest gun in the wellbore, to perforate the wellbore at different intervals and at different depths. Each gun can be addressed individually from the surface acquisition system and can be detonated on command from the operator at the wellsite surface.

A third application type is a telemetry application. In this type of application, data is transferred from downhole sensors to the surface acquisition system performing a data-acquisition function. In this context, the telemetry system can perform the intended function employing less protocol overhead due to the architecture thereof. Additional application types are set forth below with respect to Table 3.

In the physical layer, the telemetry system differentiates between two types of downhole nodes, namely, low speed downhole nodes and high speed downhole nodes. Both types of downhole nodes can share a downlink speed of 1.25 kilobits per second (kbps). The low speed downhole nodes can provide a 1.25 kbps uplink, whereas the high speed downhole nodes can also provide a 10 kbps uplink. The low speed downhole nodes can be implemented in low-cost hardware and may be implemented with low-level processing capabilities. The low speed downhole nodes may optionally include a digital-to-analog converter (DAC) capability.

The low speed downhole nodes may include a crystal oscillator to establish an accurate time base or frequency reference. When the low speed downhole nodes do not include a crystal oscillator, the surface acquisition system, which can generally be implemented with a higher level of processing capability, is operable to measure frequency drift that may be caused, for example, by a high downhole environmental temperature, and adjust the receiver and transmitter characteristics accordingly. The low speed downhole nodes have an analog-to-digital converter (ADC) capable of sampling an analog data signal at a rate that can be, without limitation, four times the downlink carrier frequency.

Table 1 below presents, without limitation, physical layer characteristics for an embodiment of a low speed downhole node.

TABLE 1

Physical characteristics of low speed nodes

| | Downlink | Uplink |
|---|---|---|
| Modulation type | DBPSK | DBPSK |
| Carrier Frequency | 5 kHz | 5 kHz |
| Baud Rate | 1.25 kbaud | 1.25 kbaud |
| Bit Rate | 1.25 kbps | 1.25 kbps |
| Symbol shape | Nyquist32, roll-off = 1, compensated by sinc(x) | Square |
| Symbol shape time span | 4 symbols | 1 symbol |
| Receiver filter | Square | Nyquist32 |
| Carrier shape | Sinusoidal | Square |
| Duplexing | Time | Time |

In Table 1 above and in Table 2 below, "Nyquist32 with roll-off=1 compensated by sin c(x)" provides at the surface acquisition system a compensated cable/channel response so that a downhole node implemented with a low level of signal processing can achieve the net result of a raised cosine for the respective communication channel. Also, DBPSK represents differential binary phase shift keying modulation and DQPSK represents differential quadrature phase shift keying modulation.

Table 2 below presents, without limitation, physical characteristics of an embodiment of a high speed downhole node.

TABLE 2

Physical characteristics of high speed nodes

| | Downlink | Uplink |
|---|---|---|
| Modulation type | DBPSK | DQPSK |
| Carrier Frequency | 5 kHz | 10 kHz |
| Baud Rate | 1.25 kbaud | 5 kbaud |
| Bit Rate | 1.25 kbps | 10 kbps |
| Symbol shape | Nyquist32, roll-off = 1, compensated by sinc(x). | Square |
| Symbol shape span | 4 symbols | 4 symbols |
| Receiver filter | Square | Nyquist32, roll-off = 1, compensated by sinc(x). |
| Carrier shape | Sinusoidal | Square |
| Duplexing | Time | Time |

Figure 8:
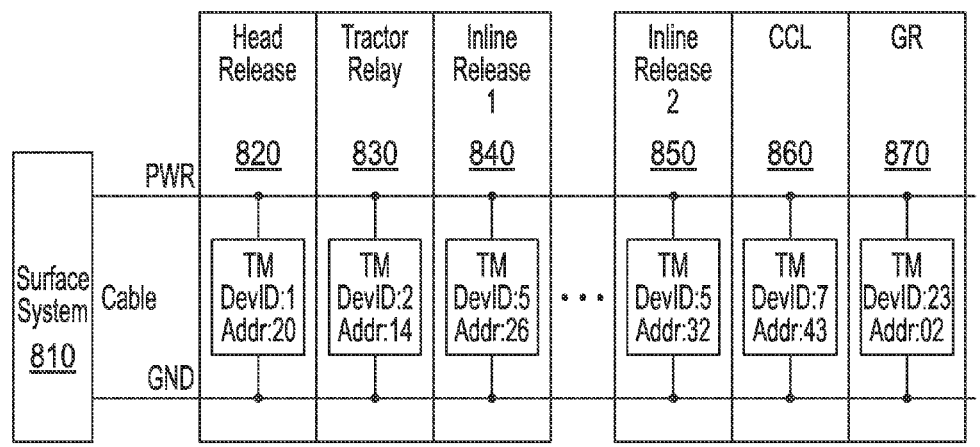
FIG. 8 is a block diagram of at least a portion of apparatus according to one or more aspects of the present disclosure.

FIG. 8 is a block diagram of at least a portion of apparatus according to one or more aspects of the present disclosure. In particular, FIG. 8 illustrates a telemetry system employing multiple drops (e.g., a multi-drop telemetry system) for a downhole tool application. The telemetry system comprises a surface acquisition system (designated Surface System) 810 coupled to a wireline (designated cable) that provides power (designated PWR) and a ground connection (designated GND) to downhole nodes including wireline tools. The wireline tools in the illustrated embodiment comprise a head release tool 820, a tractor relay tool 830, an inline release tool 1 840, an inline release tool 2 850, a casing collar locator (designated CCL) 860, and a gamma ray tool (designated GR) 870. As evident from FIG. 8, each of the downhole nodes includes a telemetry module (designated TM) and is individually addressable (e.g., the downhole node including the head release tool 820 has device identifier DevID: 1 and an address Addr: 20). Additionally, the telemetry system does not include inline switches in the illustrated embodiment.

Figure 9:
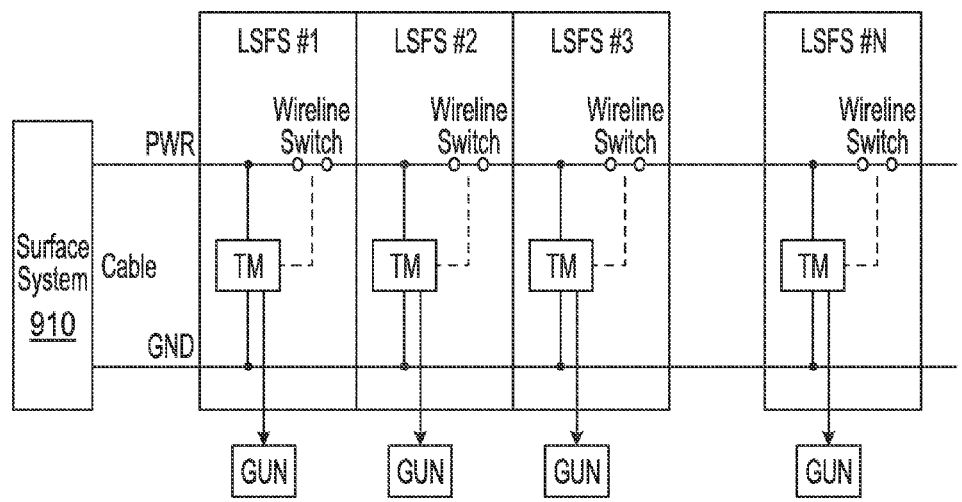
FIG. 9 is a block diagram of at least a portion of apparatus according to one or more aspects of the present disclosure.

FIG. 9 is a block diagram of at least a portion of apparatus according to one or more aspects of the present disclosure. In particular, FIG. 9 illustrates a telemetry system employing multiple drops (e.g., a multi-drop telemetry system) for a downhole tool application. The telemetry system comprises a surface acquisition system (designated Surface System) 910 coupled to a wireline (designated cable) that provides power (designated PWR) and a ground connection (designated GND) to downhole nodes (designated LSFS #1 . . . LSFS #N, and collectively or individually referred to as LSFS). The downhole nodes LSFS each include an addressable switch (designated Wireline Switch), a telemetry module (designated TM) and are coupled to a gun (designated Gun). Each telemetry module TM for a respective downhole node LSFS is operable to control the respective addressable switch to disconnect the wireline from downhole nodes LSFS more distant from the surface acquisition system 910. Each downhole node LSFS controls a respective gun GUN operable to penetrate a wall of a wellbore in response to a command from the surface acquisition system 910. In practice, the most distant downhole node LSFS #N is employed initially to penetrate the wall of the wellbore, and the next less distant downhole node LSFS #3 is then directed to control the respective addressable switch to decouple the telemetry system from the most distant downhole node LSFS #N that has already penetrated the wall of the wellbore. Of course, the sequence of operating the downhole nodes LSFS is programmable as each addressable switch is individually or collectively addressable.

Figure 10:
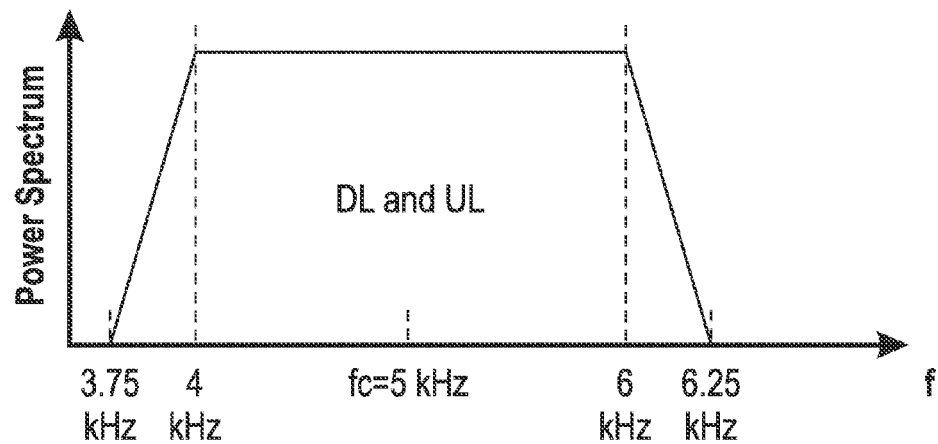
FIG. 10 is a graphical representation of a power spectrum of a downhole node according to one or more aspects of the present disclosure.

FIG. 10 is a graphical representation of a power spectrum of a downhole node according to one or more aspects of the present disclosure. In particular, FIG. 10 illustrates an amplitude of the power spectrum (plotted on the vertical axis) for low speed downhole nodes for downlink (DL) and uplink (UL) communication paths or channels. The frequency of the communication channel is plotted on the horizontal axis of the graphical representation. For both the downlink and the uplink, the frequency is centered at 5 kHz, and extends with a flat spectral amplitude from 4 kHz to 6 kHz. The amplitude of the power spectrum tapers off to a lower frequency limit of 3.75 kHz and an upper frequency limit of 6.25 kHz. Thus, the utilized bandwidth for a low speed downhole node can extend, without limitation, over a frequency range of 2.5 kHz.

Figure 11:
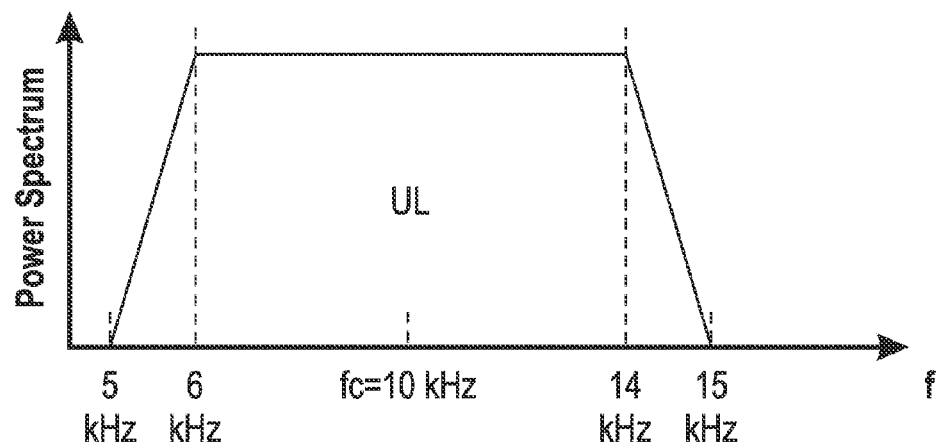
FIGS. 11 and 12 are graphical representations of a power spectrum of a signal communicating with downhole node according to one or more aspects of the present disclosure.
Figure 12:
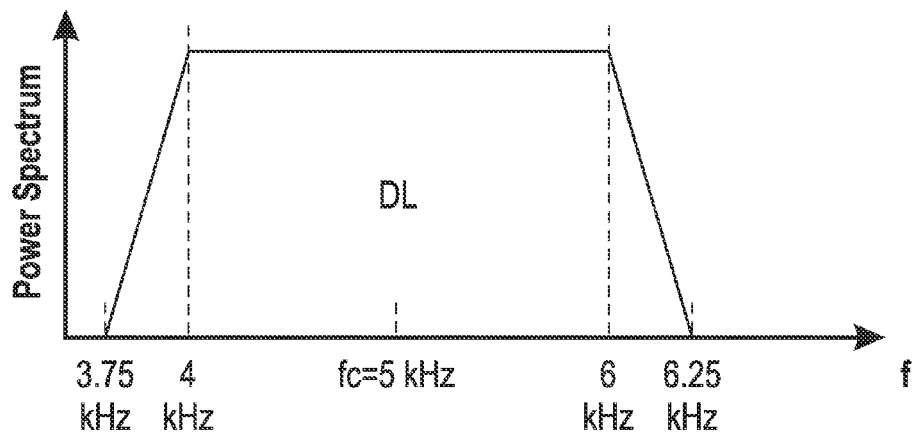

FIGS. 11 and 12 are graphical representations of a power spectrum of a signal communicating with a downhole node according to one or more aspects of the present disclosure. In particular, FIG. 11 illustrates an amplitude of the power spectrum (plotted on the vertical axis) for high speed downhole nodes for uplink (UL) communication paths or channels, and FIG. 12 illustrates an amplitude of the power spectrum (plotted on the vertical axis) for high speed downhole nodes for downlink (DL) communication paths or channels. The frequency of the respective communication channels is plotted on the horizontal axis of the graphical representations. For the uplink communication channels as illustrated in FIG. 11, the frequency of a high speed downhole node is centered at 10 kHz and can extend, without limitation, over a bandwidth of 10 kHz. For the downlink communication channels as illustrated in FIG. 12, the frequency of a high speed downhole node is centered at 5 kHz and can extend, without limitation, over a bandwidth of 2.5 kHz.

Figure 13:
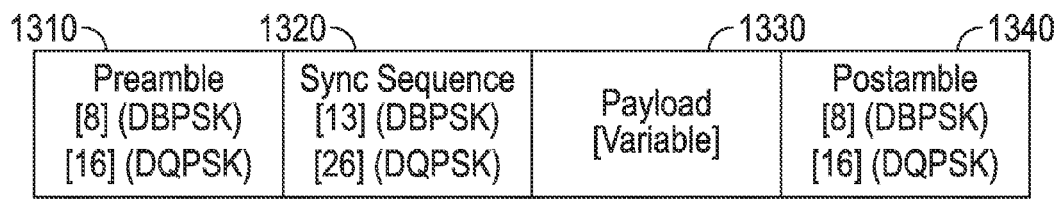
FIG. 13 is a block diagram of a frame format operable with a telemetry system according to one or more aspects of the present disclosure.

FIG. 13 is a block diagram of a frame format operable with a telemetry system according to one or more aspects of the present disclosure. To support features as described with respect to the telemetry system, the uplink and downlink frames are constructed with a plurality of fields. The fields in a frame may be differentially encoded. In accordance therewith, FIG. 13 illustrates a physical (PHY) frame format employable with the telemetry system. The numbers in square brackets are representative bit lengths of each field. The frame format includes a preamble 1310 formed with eight bits for a DBPSK signal and 16 bits for a DQPSK signal. A synchronizing sequence 1320 then follows formed with 13 bits for a DBPSK signal and 26 bits for a DQPSK signal. The third element of the frame format is the data payload 1330, which can be formed with a variable number of bits. The last element in the frame format is a postamble 1340 formed with 8 bits for a DBPSK signal and 16 bits for a DQPSK signal.

An initial state of a differential encoder in an interface module (e.g., a modem) in a telemetry module is "0" and the modem starts running with the first bit of the preamble 1310. The differential encoder is initialized at each frame. For DBPSK, the preamble 1310 of a message is formed by a sequence of eight differentially encoded ones {1, 1, 1, 1, 1, 1, 1, 1}. For DQPSK, the preamble 1310 of a message is formed by a sequence of 16 differentially encoded ones {1, 1, 1, 1, 1, 1, 1, 1, 1, 1, 1, 1, 1, 1, 1, 1} to keep a substantially constant preamble size of eight symbols. For DBPSK, a Barker-13 synchronization sequence 1320 can be used, i.e., {1, 0, 1, 0, 1, 1, 0, 0, 1, 1, 1, 1, 1}. For DQPSK, bit-repetitions of the Barker-13 sequence can be used for synchronization, i.e., {11, 00, 11, 00, 11, 11, 00, 00, 11, 11, 11, 11, 11}. For DBPSK, the message postamble 1340 is formed by a sequence of eight differentially encoded ones {1, 1, 1, 1, 1, 1, 1, 1}. For DQPSK, the postamble 1340 is formed by a sequence of 16 differentially encoded ones: {1, 1, 1, 1, 1, 1, 1, 1, 1, 1, 1, 1, 1, 1, 1, 1} to keep a substantially constant postamble size of eight symbols.

Figure 14:
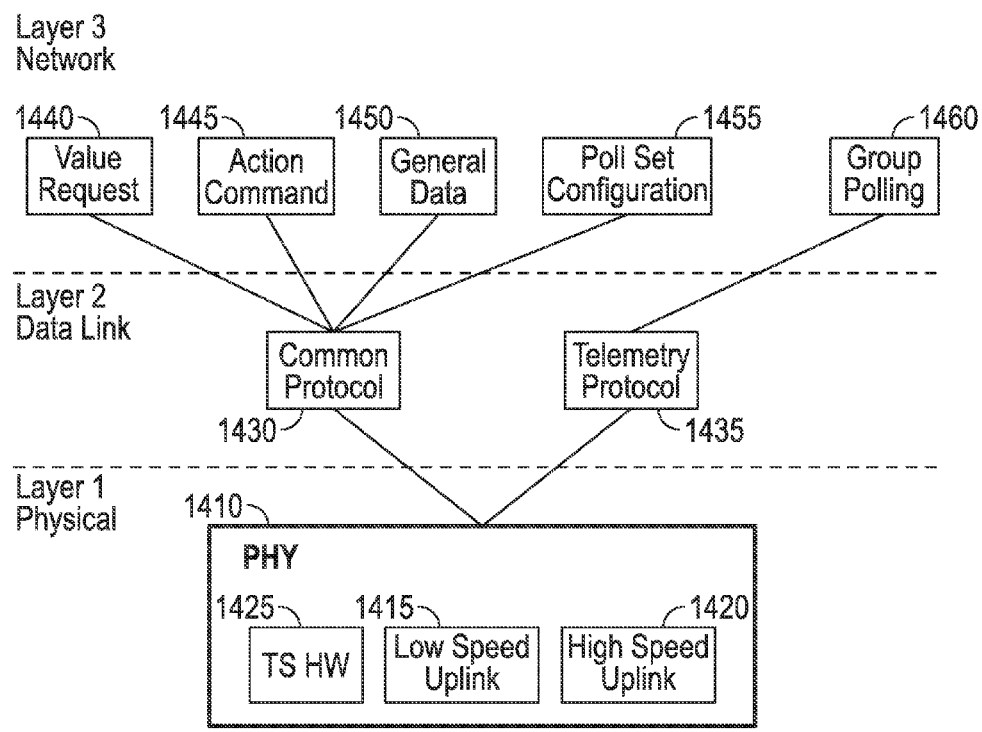
FIG. 14 is a block diagram of a model partitioning layers of at least a portion of a telemetry system according to one or more aspects of the present disclosure.

FIG. 14 is a block diagram of a model partitioning layers of at least a portion of a telemetry system according to one or more aspects of the present disclosure. Analogous to the Open Systems Interconnection (OSI) model of communication systems, the telemetry system can be partitioned according to the respective functions of the systems, subsystems and modules thereof. Layer 1 represents the physical (PHY) layer 1410 including the communication paths or channels (designated low speed uplink 1415 and high speed uplink 1420) and the downhole tools and/or hardware that constitutes the telemetry system (designated telemetry system hardware (TS HW) 1425).

The telemetry system can be implemented with two types of a data link layer (Layer 2) protocols including common protocol 1430 and a telemetry protocol 1435. The common protocol 1430 is a one-to-one, master-slave, poll-response protocol. The telemetry protocol 1435 is a one-to-many, poll-response protocol that can be a master-slave protocol that can be employed to achieve a high rate for telemetry data.

The Layer 3 supports a suite of protocols including, without limitation, a value request command 1440, an action command 1445, a general data protocol 1450, and a poll set configuration command 1455 that supports a group polling protocol 1460. These protocols are supported by the Layer 2 common protocol 1430. The group polling protocol 1460 is supported by the Layer 2 telemetry protocol 1435.

A limitation of previous wired wellbore telemetry systems is the low speed of downlink communication, which is a result of supporting devices implemented with low-end microcontrollers. Polling of the downhole nodes represents a considerable proportion of the cable time of the telemetry system. A strategy introduced herein to reduce downlink transmission time is to employ a telemetry system with a multi-drop topology and multicast polling.

The network topology is formed by a master (e.g., a surface acquisition system) and multiple slave nodes (e.g., downhole nodes) that can be connected via a T7 telemetry mode using hepta cable, monocable or coaxial cable in a multi-drop arrangement. Addressable switches are a special case wherein each downhole node provides an in-line switch that isolates the communication path therebelow.

The downhole nodes communicate directly to surface acquisition system above the wellbore in a master-slave arrangement. The surface acquisition system polls the downhole nodes and expects a one-to-one response (except in the general data protocol, where control is left to an upper layer application). Device control applications are supported by an action command protocol. In an embodiment, two layers of error detection can be implemented to avoid misinterpretation of commands. Device control devices can be connected in a multi-drop configuration.

In addressable switch applications (e.g., a perforation addressable switch), a difference is due to the in-line switch that can be opened to isolate the communication path below, thereby converting multi-drop communication into a one-to-one communication. The ability to make a physical connection to a single downhole node at a time allows the use of the value request protocol to retrieve the node identifier (ID) of each switch (hence, enabling inventory management) using a broadcast address. Therefore, the network setup does not need previous knowledge of the downhole node ID. The action command protocol is used to issue commands to the downhole node (e.g., ARM and FIRE commands).

Low-speed telemetry data can be retrieved by interrogating each downhole node for a measured sample using the value request protocol. However, the low speed of the downlink limits the time that can be spent performing polling. For telemetry applications, downhole nodes are assigned to one or more poll sets. Every poll set contains a scheduled transmission window for each included downhole node. Poll set descriptors are downloaded to each downhole node during the network startup or training. The configured polling sets reduce the polling load by enabling a group poll command to interrogate a set of downhole nodes. Scheduling of the transmission windows upon toolstring configuration entered in the operating system can be performed by an application code running either on the surface acquisition system or the downhole nodes.

According to one aspect of the present disclosure, a telemetry system is provided with a communication path formed with an electrically conductive transport medium, e.g., a multi-conductor cable (e.g., a "hepta" seven-conductor cable) and/or a single-conductor cable (e.g., a coaxial cable) coupled across a plurality of downhole nodes. To achieve operation on the communication path with a multi-drop system that provides telemetry to the downhole nodes in a wellbore, modulation of a 5 kHz or a 10 kHz tone is employed in a master-slave arrangement using binary differential phase shift keying or differential quadrature phase shift keying, including line equalization to compensate for attenuation characteristics of the communication path. Each downhole node can be polled or otherwise identified on demand using a unique node identifier. The telemetry system supports a plurality of downhole functions, e.g., multiple downhole nodes that have the capability to access the communication path at substantially the same time without the use of switches.

A control-type application type is provided wherein a user-initiated command is transmitted from a surface acquisition system to a downhole node to perform a specific downhole action. A second application type provides surface control for a wellbore perforation addressable switch employing an encoded signal. A third application type is a telemetry application. In this type of application, data is transferred from downhole sensors to the surface acquisition system performing a data-acquisition function.

The telemetry system is formed with low speed downhole nodes and high speed downhole nodes on a common wireline cable. Telemetry equipment such as the surface acquisition system at a wellsite surface, which can generally be implemented with a high level of processing capability, is configured to measure frequency drift of signals received from downhole nodes. A variable size payload can be used in frames transmitted between the surface acquisition system and downhole nodes.

The telemetry system supports a common protocol and a telemetry protocol. The common protocol is a one-to-one, master-slave poll response protocol. The telemetry protocol is a one-to-many poll-response protocol, also with a master-slave structure in a wireline telemetry system. The network layer of the telemetry system supports several protocols such as a value request command, an action command, a general data protocol, and a poll set configuration command that includes a group polling protocol. The telemetry system network topology is formed by a master in a wireline addressable front end system or in an enhanced wireline acquisition front end system (e.g., within the surface acquisition system) and multiple downhole slave nodes. A general data-transparent protocol is provided to encapsulate higher level protocols and enable communications in applications such as on-board programming, remote terminals, etc. In this protocol, flow control is implemented by the application.

Table 3 below presents a matrix relating telemetry system applications in the telemetry architecture to the communications protocols used to support the same.

TABLE 3

Telecommunication System Applications and Telemetry Architecture Protocols

| | | LTS Applications | | | |
|---|---|---|---|---|---|
| | | LSFS | Device Control | Telemetry | Encapsulation |
| Level 3 LTS Protocols | Value request | ✓ | ✓ | ✓ | ✓ |
| | Action command | ✓ | ✓ | ✓ | ✓ |
| | General data | | | | ✓ |
| | Poll set configuration | | | ✓ | |
| | Group polling | | | ✓ | |

In an embodiment, the telemetry system architecture employs poll sets that are multicast addresses created by a scheduler application to allow an operator to obtain a certain class of data. To allow the flexibility provided by multiple poll sets, each downhole node can respond to one or more of the poll sets, and several downhole nodes can belong to one or more of the poll sets. This allows co-existence of downhole nodes with different polling rates, and reduces the number of downlink polling commands performed over a communication path. Each downhole node is addressed by its unique ID address, which is employed using a common protocol in a multicast process to assign each downhole node to one or more poll sets to inform each downhole node of its timing (e.g., a schedule, in which the downhole node can respond under a telemetry protocol to a data request or an action command). The assignment of the downhole nodes to poll sets can be performed with an algorithm or manually.

The following example application illustrates the concept of poll sets. The example application contains three downhole nodes, namely, A, B and C. The downhole node A obtains a telemetry signal at 62.5 Hertz (Hz) with a sampling frequency (16 milliseconds (ms)), while the downhole nodes B and C obtain telemetry signals sampled at 15.625 Hz each (64 ms). It is assumed that the surface acquisition system polls the communication path at 7.8125 Hz (128 ms). The discussion that follows with the accompanying FIGURES provides example transmission schedules using the aforementioned parameters.

Figure 15:
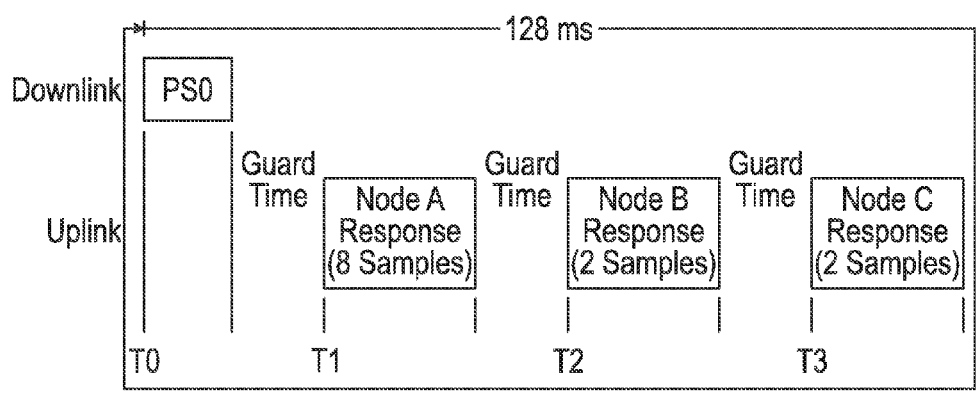
FIGS. 15 to 17 are block diagrams demonstrating schedule arrangements for polling downhole nodes with a telemetry system according to one or more aspects of the present disclosure.
Figure 16:
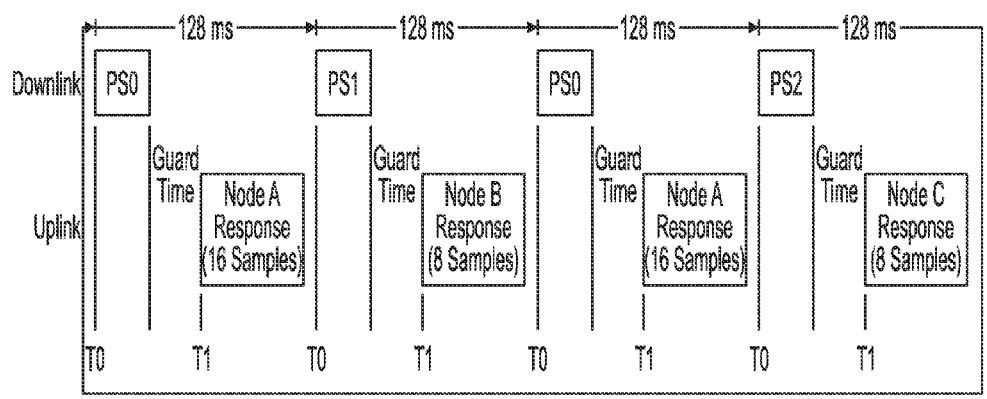
Figure 17:
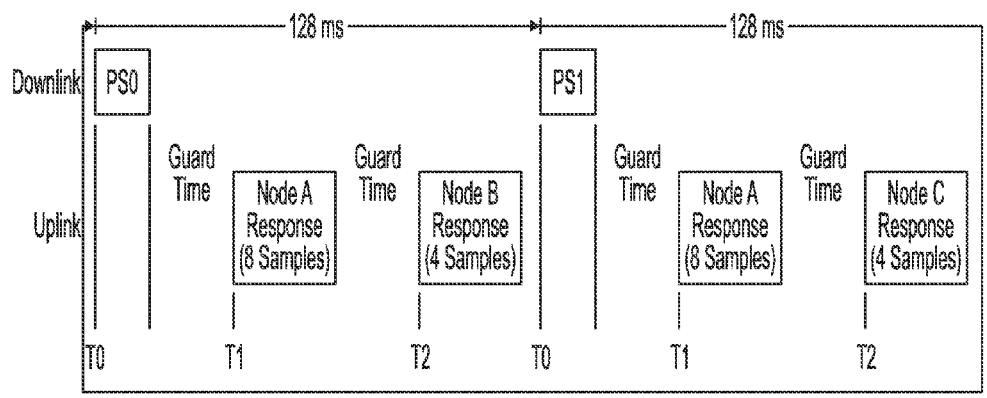

FIGS. 15 to 17 are block diagrams demonstrating schedule arrangements for polling downhole nodes (designated Node A, Node B, Node C) with a telemetry system according to one or more aspects of the present disclosure. In a schedule 1 illustrated in FIG. 15, the downhole nodes receive a time allocation during a 128 ms polling cycle. During the setup time, the downhole Node A, Node B, Node C are operable to respond (in an uplink) to poll set zero PS0 (in a downlink) at times T1, T2 and T3, respectively, with respect to the start of the polling frame at time T0. Guard times are included to account for processing time. The downhole Node A responds with eight samples at the time T1. The downhole Node B responds with two samples at the time T2. The downhole Node C responds with two samples at the time T3.

In a schedule 2 illustrated in FIG. 16, better throughput is obtained at the expense of transmission latency. In the schedule 2, the download Node A responds (in the uplink) at a time T1 to poll set zero PS0 (in the downlink) at a time T0 with 16 samples during a first and third 128 ms polling cycle. The download Node B responds (in the uplink) at a time T1 to poll set one PS1 (in the downlink) at a time T0 with eight samples during a second 128 ms polling cycle. The download Node C responds (in the uplink) at a time T1 to poll set two PS2 (in the downlink) at a time T0 with eight samples during a fourth 128 ms polling cycle. Again, guard times are included to account for processing time.

In a schedule 3 illustrated in FIG. 17, the download Node A responds (in the uplink) at a time T1 to poll set zero PS0 (in the downlink) at a time T0 with eight samples during a first 128 ms polling cycle. The download Node B responds (in the uplink) at a time T2 to poll set zero PS0 (in the downlink) at a time T2 with four samples during the first 128 ms polling cycle. Additionally, the download Node A responds (in the uplink) at a time T1 to poll set one PS1 (in the downlink) at a time T0 with eight samples during a second 128 ms polling cycle. The download Node C responds (in the uplink) at a time T2 to poll set one PS1 (in the downlink) at a time T0 with four samples during the second 128 ms polling cycle. Again, guard times are included to account for processing time. The schedule 3 provides a tradeoff between latency and efficiency.

The surface acquisition system based on an application can define a poll set schedule appropriate for the specific telemetry downhole node mix. The polling frames can be generated in the surface acquisition system in such a way that the telemetry data is pushed thereto without polling over the surface acquisition system interface. Any number of poll sets (e.g., eight) can be created by the surface acquisition system. Example polling rates derived from legacy telemetry system rates are presented below in Table 4.

TABLE 4

Supported polling intervals

| Available polling rates (Hz) | Time (ms) |
| --- | --- |
| 62.5 | 16 |
| 31.25 | 32 |
| 15.625 | 64 |
| 7.8125 | 128 |
| 3.90625 | 256 |
| 1.953125 | 512 |
| 0.9765625 | 1024 |

After a schedule is created, the surface acquisition system passes a polling configuration or routine (e.g., the poll sets) to the downhole nodes. Each downhole node receives a list of applicable polling sets with the times and number of samples per value type, as well as an 8-bit "node alias" to permit verification of the originating node. The node alias is a unique 8-bit number assigned to each downhole node running the group polling telemetry mode. A set of aliases with a large Hamming distance can be used reduce the probability of downhole node confusion.

FIG. 18 is a block diagram of a poll set configuration frame according to one or more aspects of the present disclosure. The poll set configuration frame is formed with eight bits specifying the poll set configuration 1810, followed by 24 bits identifying the node (a downhole node identifier 1820). Next, eight bits specify the length 1830 of the poll set configuration frame, followed by a variable number of bits providing a poll set descriptor 1840. Finally, an 8-bit cyclic redundancy check (CRC) field 1850 is appended to the end of the poll set configuration frame.

FIG. 19 is a block diagram of a data structure for a poll set descriptor of a poll set configuration frame according to one or more aspects of the present disclosure. The poll set descriptor begins with an eight bit node identifier 1910 of a downhole node alias. The downhole node alias is then followed by one or more poll set configuration fields 1920, 1930. The poll set configurations fields 1920, 1930 each include a poll set identifier field PS(n), PS(m), a transmit time field (Tx time), a number of values field with respect to the poll set identifiers PS(n), PS(m), a value ID field and number of bytes of the value ID field with respect to the poll set identifiers PS(n), PS(m), and a checksum field (8 bits) with respect to the poll set identifiers PS(n), PS(m).

FIG. 20 is a block diagram of a data structure for a transmit time field of a poll set descriptor of a poll set configuration frame according to one or more aspects of the present disclosure. The downhole nodes may be timed by a surface poll set transmitted from a surface acquisition system. In the case of single-node applications, however, the downhole node may be left in a self-timing mode. In that case, the self-timed mode provides a mechanism to allow the downhole node to transmit data without intervention by the surface acquisition system. In this application, the downhole node may be power-cycled to regain control. As illustrated in FIG. 20, a timing source field 2010 identifies a timing source with a leading bit, wherein a zero represents a surface poll and a one represents self-timing (free running) polling. A time to transmit field 2020 can be a 15 bit field that provides a time to transmit telemetry data in, without limitation, 800 microsecond (µs) increments between start of the frames.

Figure 21:
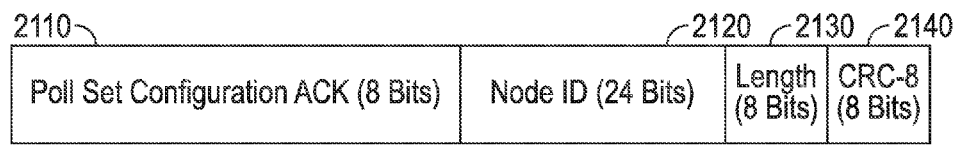
FIG. 21 is a block diagram of a data structure for a poll set acknowledgement frame according to one or more aspects of the present disclosure.

FIG. 21 is a block diagram of a data structure for a poll set acknowledgement frame according to one or more aspects of the present disclosure. Each downhole node responds to a poll set configuration with a poll set acknowledgement frame. The poll set acknowledgement frame begins with a poll set configuration acknowledge (ACK) field 2110 of eight bits. This is followed with a node identifier (ID) field 2120 of 24 bits. The poll set acknowledgement frame also includes a length field 2130 of eight bits, followed by a cyclic redundancy check (CRC) field 2140 of eight bits.

Figure 22:
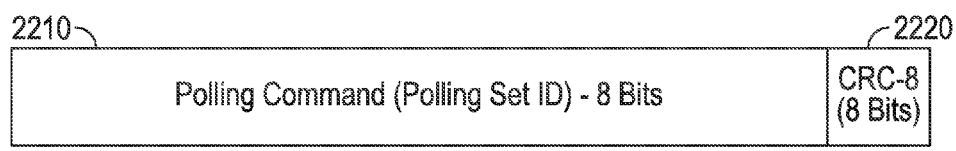
FIG. 22 is a block diagram of a data structure for a polling command according to one or more aspects of the present disclosure.

After the polling sets are configured, the downhole nodes respond to group polling commands. The poll set multicast addresses are encoded in a type field, thereby keeping the polling frames short. In accordance therewith, FIG. 22 is a block diagram of a data structure for a polling command according to one or more aspects of the present disclosure. The polling command includes a polling set ID field 2210 of eight bits followed by a CRC field 2220 of another eight bits.

Figure 23:
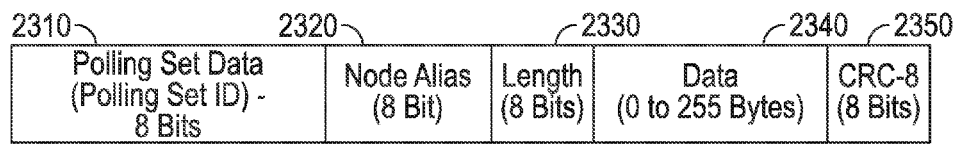
FIG. 23 is a block diagram of a data structure for a polling response from a downhole node to a polling command according to one or more aspects of the present disclosure.

FIG. 23 is a block diagram of a data structure for a polling response from a downhole node to a polling command according to one or more aspects of the present disclosure. The polling response begins with a polling set identifier field 2310 of eight bits, followed by an 8-bit node identifier field 2320 of the node alias. This is followed with a length field 2330 of eight bits followed by a data field 2340 of zero to 256 bytes. The polling response is terminated with a CRC field 3350 of eight bits.

Action and value requests can preempt a telemetry protocol. The telemetry protocol has a lower priority than the common protocol. The surface acquisition system prioritizes action and value requests over telemetry polls. If polls are interrupted by a higher priority message, the polls may not be transmitted before the start of the next poll cycle. In the case that retransmission of telemetry data is not supported, the loss of a poll implies the loss of buffered telemetry data.

Figure 24:
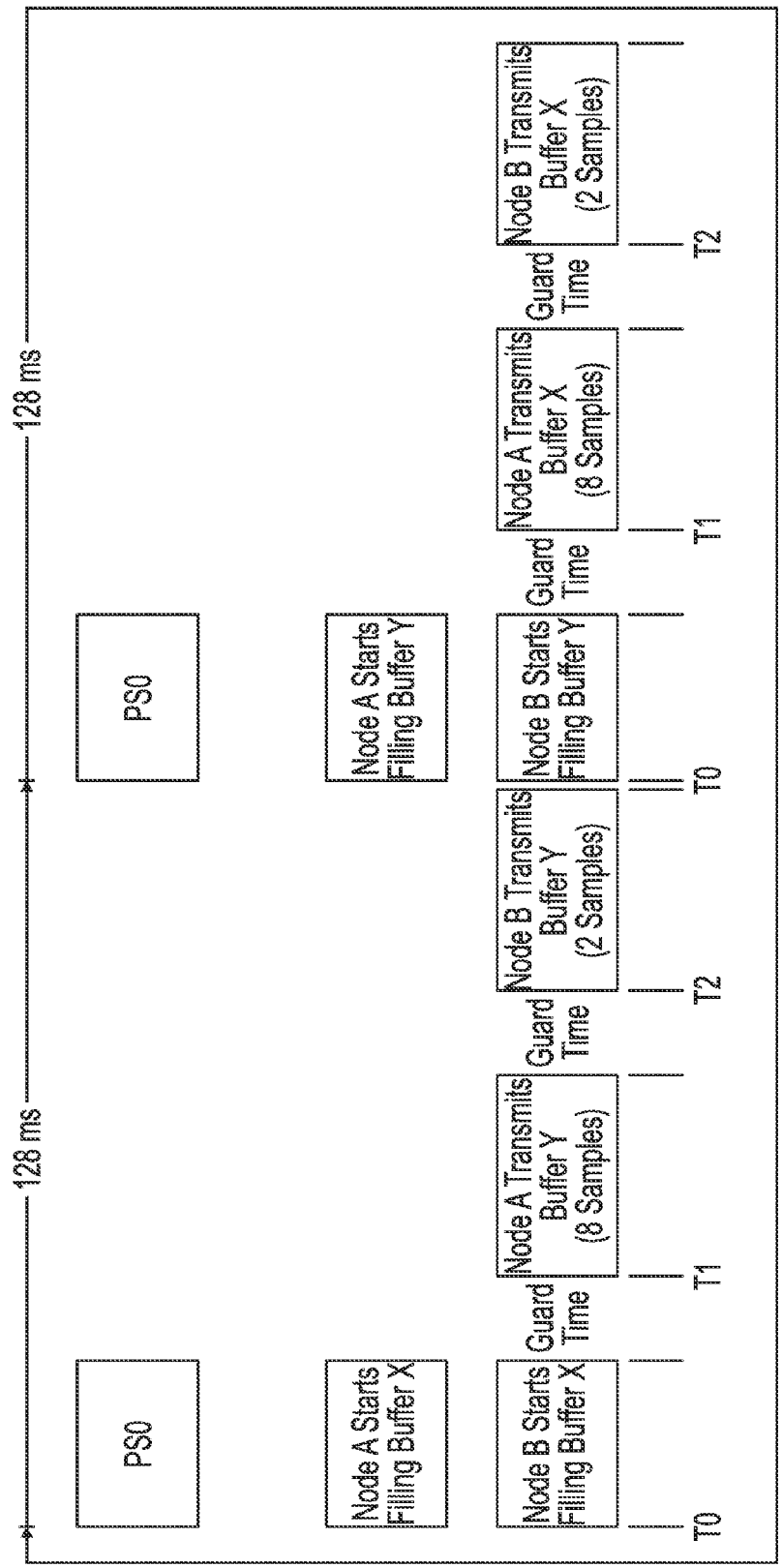
FIG. 24 is a sampling alignment strategy according to one or more aspects of the present disclosure.

Time stamping is performed at the surface acquisition system based on measurements of round-trip time and buffering latency performed by a processor thereof. Alignment of samples is performed by using the polling frames. In accordance therewith, FIG. 24 is a sampling alignment strategy according to one or more aspects of the present disclosure. In the illustrated embodiment, the sampling alignment strategy is employed with a poll set zero PS0 with downhole nodes Node A, Node B. The time alignment of the samples is accomplished using ping-pong buffers (double buffers) "X" and "Y", as opposed to sample queuing. This mode of operation means that the first buffer of data obtained by polling (or after a disruption) is discarded by the surface acquisition system and the corresponding data marked as lost.

As illustrated in FIG. 24, first and second 128 ms polling cycles are employed using the ping-pong buffers "X" and "Y". In the first 128 ms polling cycle, at a time T0 in response to the poll set zero PS0 (in a downlink), the downhole Node A and the downhole Node B start filling the respective X buffers with telemetry data. At a time T1, the downhole Node A starts transmitting (in an uplink) the telemetry data (eight samples) from the respective Y buffer and, at a time T2, the downhole Node B starts transmitting (in the uplink) the telemetry data (two samples) from the respective Y buffer. In the second 128 ms polling cycle, at a time T0 in response to the poll set zero PS0 (in a downlink), the downhole Node A and the downhole Node B starts filling the respective Y buffers with telemetry data. At a time T1, the downhole Node A starts transmitting (in the uplink) the telemetry data (eight samples) from the respective X buffer and, at a time T2, the downhole Node B starts transmitting (in the uplink) the telemetry data (two samples) from the respective X buffer. Again, guard times are included to account for processing time.

Figure 25:
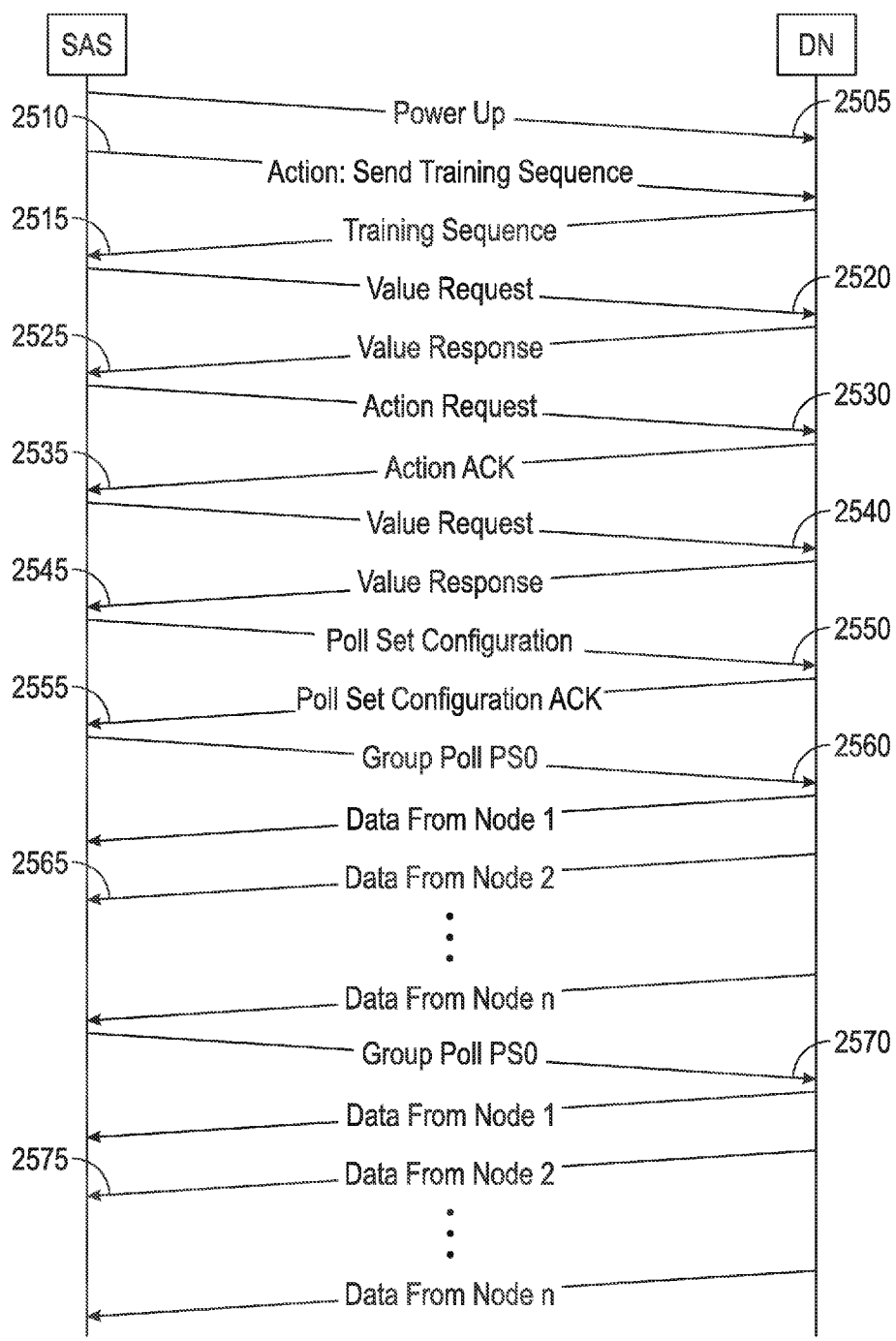
FIG. 25 is a timing diagram of an interaction between a surface acquisition system and a plurality of downhole nodes for group polling according to one or more aspects of the present disclosure.

FIG. 25 is a timing diagram of an interaction between a surface acquisition system (designated SAS) and a plurality of downhole nodes (designated DN) for group polling according to one or more aspects of the present disclosure. Initially, the surface acquisition system powers up (2505) the downhole nodes followed by a request for a training sequence (2510) sent by the surface acquisition system to the downhole nodes. The downhole nodes respond with the respective training sequences (2515) to the surface acquisition system. The training sequences may be Frank sequences or an expected type plus address fields from a poll response. The surface acquisition system then sends a value request (2520) to which the downhole nodes respond with the respective value responses (2525) to the surface acquisition system. Examples of value requests and value responses comprise temperature, voltage and/or downhole node address or ID. The surface acquisition system then sends an action request (2530) to which the downhole nodes respond with the respective action acknowledgement (ACK) (2535) to the surface acquisition system. Examples of action requests comprise ARM and FIRE (in the case of guns), or ARM and RELEASE in the case of release devices.

The surface acquisition system then sends a second value request (2540) to which the downhole nodes respond with the respective value responses (2545) to the surface acquisition system. As an example, a first value request may be for a downhole node address or ID (e.g., for inventory purposes) and a second value request may be for a temperature of the downhole node. Another value request may be issued to determine of the downhole node can support a high speed telemetry protocol. The surface acquisition system then sends a poll set configuration (2550) to which the downhole nodes respond with the respective poll set configuration ACK (2555) to the surface acquisition system. The surface acquisition system then sends a group poll set zero PS0 (2560) to which the downhole nodes respond with the respective telemetry data (collectively designated 2565) to the surface acquisition system according to the group poll set zero PS0. The surface acquisition system then sends a second group poll set zero PS0 (2570) to which the downhole nodes respond with the respective telemetry data (collectively designated 2575) to the surface acquisition system according to the second group poll set zero PS0.

Figure 26:
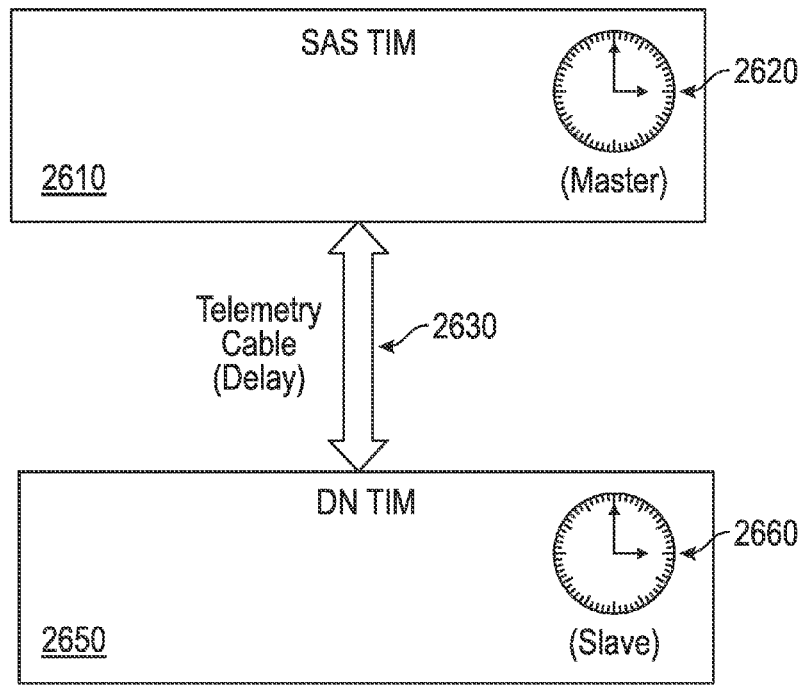
FIG. 26 is a block diagram illustrating synchronization between a master clock in a surface acquisition system and a slave clock in a downhole node according to one or more aspects of the present disclosure.

FIG. 26 is a block diagram illustrating synchronization between a master clock 2620 in a surface acquisition system and a slave clock 2660 in a downhole node according to one or more aspects of the present disclosure. Synchronization between the master clock 2620 and the slave clock 2660 is employed to match messages with surface depth measurements and to correlate tool measurements with surface activity such as seismic firing, etc. A surface acquisition system telemetry interface module (designated SAS TIM) 2610 transmits a clock time over a physical layer (a telemetry cable 2630 such as a hepta cable) to a downhole node telemetry interface module (designated DN TIM) 2650 at a known instant. The downhole node telemetry interface module 2650 estimates a delay associated with the telemetry cable 2630 and adjusts the slave clock 2660 accordingly.

Figure 27:
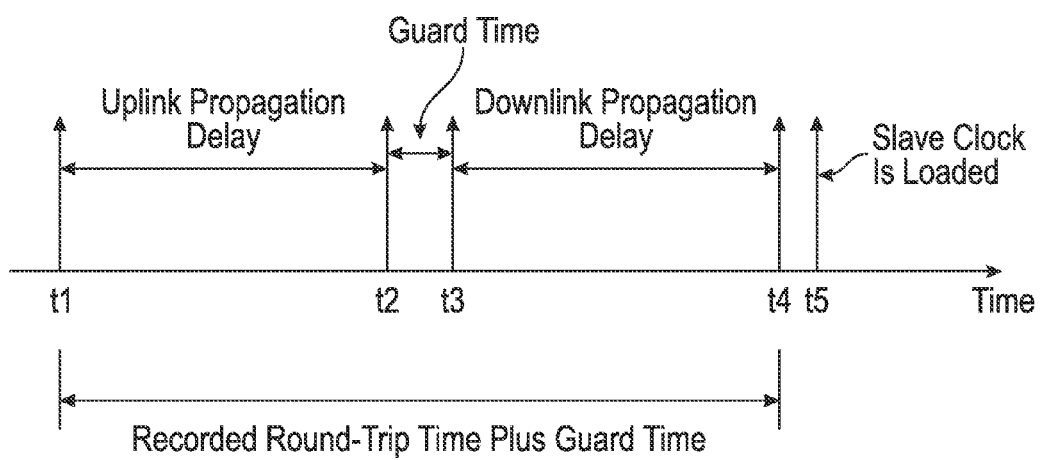
FIG. 27 is a timing diagram illustrating propagation delay between a surface acquisition system and a downhole node according to one or more aspects of the present disclosure.

FIG. 27 is a timing diagram illustrating propagation delay between a surface acquisition system and a downhole node according to one or more aspects of the present disclosure. In particular, the timing diagram demonstrates roundtrip uplink and downlink propagation delays that enable computation of the propagation delay along a telemetry cable between a surface acquisition system telemetry interface module and a downhole node telemetry interface module. Computation of the propagation delay enables time synchronization between a master clock and a slave clock as illustrated in FIG. 26.

At a time t1, the downhole node telemetry interface module employing, for instance, a T5 telemetry mode, initiates an uplink transmission. The uplink transmission is delayed before being received by the surface acquisition system telemetry interface module by a propagation delay as illustrated by uplink propagation delay 2710 between times t1 and t2. The surface acquisition system telemetry interface module then initiates a downlink transmission at time t3 after a suitable but known guard time. The downlink transmission from the surface acquisition system telemetry interface module to the downhole node telemetry interface module is then delayed by a downlink propagation delay between the times t3 and t4. The downhole node telemetry interface module records a round-trip time for the uplink and downlink transmissions including the known guard time, which enables computation of the uplink and downlink propagation delays, which are assumed to be equal. The downhole node telemetry interface module then loads the slave clock at time t5. The computation of round-trip time can be facilitated by the inclusion of timestamps recorded in the surface acquisition system and the downhole node to account for internal computation and other processing delays, thereby enabling computation of propagation delay.

According to another aspect of the present disclosure, a telemetry system is provided with a communication protocol to convey real time telemetry data from downhole nodes coupled to downhole tools (e.g., wireline tools) using low speed telemetry. A scheduler application creates a time allocation table and defines groups of downhole nodes that respond consecutively to a poll request (including a poll set). The telemetry system assigns at least one poll set to transmit telemetry data to and from one or more downhole nodes. An error detection system such as a cyclic redundancy check is employed to ensure robust communication while reducing overhead. Configuration frames employed by surface acquisition system to assign a poll set for communication of telemetry data from a downhole node, as well as assigning times and data to transmit when a group poll is received. Time stamping is performed at the surface acquisition system based on measurements of round-trip time and buffering latency performed by a processor thereof. Sampling poll arrival times can be employed for synchronizing communication of telemetry data.

In view of all of the above, including the FIGURES, a person having ordinary skill in the art should readily recognize that the present disclosure introduces a telemetry system employable with surface acquisition system and downhole nodes in a wellbore through a subterranean formation.

The systems and methods introduced in the present disclosure are susceptible to various modifications, variations, and/or enhancements without departing from the scope of the present disclosure. For example, different configurations can be employed for the integrated sensor to accommodate a downhole tool or other challenging environment. Accordingly, the present disclosure expressly encompasses all such modifications, variations, and enhancements within its scope.

The foregoing outlines features of several embodiments so that a person having ordinary skill in the art may better understand the aspects of the present disclosure. A person having ordinary skill in the art should appreciate that they may readily use the present disclosure as a basis for designing or modifying other processes and structures for carrying out the same purposes and/or achieving the same advantages of the embodiments introduced herein. A person having ordinary skill in the art should also realize that such equivalent constructions do not depart from the spirit and scope of the present disclosure, and that they may make various changes, substitutions and alterations herein without departing from the spirit and scope of the present disclosure.

The Abstract at the end of this disclosure is provided to comply with 37 C.F.R. § 1.72(b) to allow the reader to quickly ascertain the nature of the technical disclosure. It is submitted with the understanding that it will not be used to interpret or limit the scope or meaning of the claims.

What is claimed is:

1. A method, comprising:
   providing a telemetry system with a communication path formed with an electrically conductive transport medium coupled across a plurality of downhole nodes, wherein the telemetry system comprises:
      low speed downhole nodes and high speed downhole nodes on a common wireline cable;
      a surface acquisition system at an associated wellsite surface operable to measure frequency drift of signals received from downhole nodes; and
      a variable size payload is used in frames transmitted between the surface acquisition system and downhole nodes;
   operating on the communication path with a multi-drop system that provides telemetry to the downhole nodes in a wellbore, including employing modulation of a tone in a master-slave arrangement using binary differential phase shift keying or differential quadrature phase shift keying, wherein the telemetry system supports a plurality of downhole functions, and wherein multiple downhole nodes access the communication path without the use of switches.

2. The method of claim 1, further comprising line equalization to compensate for attenuation characteristics of the communication path.

3. The method of claim 1, further comprising identifying on demand each downhole node using a unique node identifier.

4. The method of claim 1, further comprising providing a control-type application type, wherein a user-initiated command is transmitted from a surface acquisition system to a downhole node to perform a specific downhole action.

5. The method of claim 4, wherein the specific downhole action includes sending a value to surface.

6. The method of claim 1, further comprising providing a second application type which provides surface control for a wellbore perforation addressable switch employing an encoded signal.

7. The method of one of claim 1, further comprising continuous data acquisition by which data is transferred from downhole sensors to the surface acquisition system performing a data-acquisition function.

8. The method of claim 1 wherein:
   the telemetry system is formed with low speed downhole nodes and high speed downhole nodes on a common wireline cable;
   a surface acquisition system at an associated wellsite surface operable to measure frequency drift of signals received from downhole nodes; and
   a variable size payload is used in frames transmitted between the surface acquisition system and downhole nodes.

9. The method of claims 1, wherein the telemetry system supports a common protocol and a telemetry protocol chosen for one of a one-to-one, master-slave poll response protocol or a one-to-many poll-response protocol with a master-slave structure.

10. The method of claim 9, wherein the network layer of the telemetry system supports several protocols, including a value request command, an action command, a general data protocol, and a poll set configuration command that includes a group polling protocol.

11. The method of claim 10, wherein the telemetry system network topology is formed by a master in a wireline addressable front end system or in an enhanced wireline acquisition front end system and multiple downhole slave nodes.

12. An apparatus, comprising:
   a telemetry system with a communication protocol to convey real time telemetry data from downhole nodes coupled to downhole tools using low speed telemetry, wherein the telemetry system comprises:
      low speed downhole nodes and high speed downhole nodes on a common wireline cable;
      a surface acquisition system at an associated wellsite surface operable to measure frequency drift of signals received from downhole nodes; and
      a variable size payload is used in frames transmitted between the surface acquisition system and downhole nodes;
   a scheduler application operable to create a time allocation table and define groups of downhole nodes that respond consecutively to a poll request, wherein the telemetry system is operable to assign at least one poll set to transmit telemetry data to and from one or more downhole nodes; and an error detection system operable to ensure robust communication while reducing overhead.

13. The apparatus of claim 12, wherein the surface acquisition system is configured to use a group polling protocol, wherein the surface acquisition system is operable with configuration frames to assign a poll set for communication of telemetry data from a downhole node and assign times and data to transmit when a group poll is received.

14. The apparatus of claim 12, wherein time stamping is performed at the surface acquisition system based on measurements of round trip time and buffering latency performed by a processor thereof.

* * * * *